(12) United States Patent
Usui et al.

(10) Patent No.: US 6,330,393 B1
(45) Date of Patent: Dec. 11, 2001

(54) METHOD AND DEVICE FOR INFORMATION ANTI-DUPLICATION

(75) Inventors: Takashi Usui, Tokyo; Takehiro Sugita, Kanagawa; Akira Ogino, Chiba, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/968,115

(22) Filed: Nov. 12, 1997

(30) Foreign Application Priority Data

Nov. 18, 1996 (JP) ..................................................... 8-322331

(51) Int. Cl.[7] .............................. H04N 5/913; H04N 5/76
(52) U.S. Cl. ................................................. 386/94; 386/95
(58) Field of Search ................................. 386/94, 83, 92, 386/46, 52, 4, 95; 360/13, 15, 60; 780/3, 10, 7, 11, 15; H04N 5/913, 5/76

(56) References Cited

U.S. PATENT DOCUMENTS 3,984,624    10/1976   Waggener .
5,319,735 *   6/1994   Preuss et al. ...................... 395/2.14
5,862,299 *   1/1999   Lee et al. ................................ 386/94

FOREIGN PATENT DOCUMENTS 0360615    9/1989   (EP) .
0400906    5/1990   (EP) .
0574892    6/1993   (EP) .

* cited by examiner

Primary Examiner—Robert Chevalier
(74) Attorney, Agent, or Firm—Jay H. Maioli

(57) ABSTRACT

The invention provides an information duplication prevention method and an information duplication prevention device capable of performing correct and proper duplication prevention. Prior to transmission of the information signal such as video signal, an anti-duplication control signal for preventing duplication of the information signal is transmitted. The reception side for receiving the information signal can arrange the condition for performing duplication prevention control based on the previously received anti-duplication control signal prior to reception of the information signal.

40 Claims, 17 Drawing Sheets

METHOD AND DEVICE FOR INFORMATION ANTI-DUPLICATION

BACKGROUND OF THE INVENTION

1. Field of the Invention

This invention relates to a method and device for information anti-duplication for performing anti-duplication control corresponding to an anti-duplication control signal transmitted and received together with an information signal in the case that an information for preventing duplication of a video signal played back from a recording medium is outputted and received together with a video signal in order to limit or inhibit recording of the video signal on another recording medium.

2. Description of the Related Art

VTR (Video Tape recording devices) has been popularized in daily life, and many kinds of software which can be played back on a VTR are supplied abundantly. Digital VTR or DVD (Digital Video Disks) playback devices have been available practically now, and provide images and sound of exceptionally high quality.

On the other hand, there is, however, a problem in that this great abundance of software can be copied without restriction, and several methods have already been proposed to inhibit duplication.

For example, for a VTR which outputs an analog video signal, one method to prevent copying uses a difference in the AGC (Automatic Gain Control) system, or in the APC (Automatic Phase Control) system, of the VTR recording device and of a monitor receiver for displaying the image.

When the method, in which the difference in AGC system is utilized and a VTR performs AGC using a pseudo sync signal inserted in the video signal and a monitor receiver employs a different AGC system not using the pseudo sync signal, is used, a very high level pseudo sync signal is inserted in the video signal supplied from the playback VTR and the video signal with insertion is outputted to the recording VTR as an AGC sync signal.

When the method in which the difference in APC characteristics is utilized, and a VTR performs APC using the phase of the color burst itself in the video signal and a monitor receiver employs an APC system different from that of the VTR, is used, the phase of the color burst of the video signal supplied from the playback VTR to the recording VTR is inverted partially.

As the result, the monitor receiver which receives the analog video signal from the playback VTR plays back the image correctly without being affected by the pseudo sync signal in AGC or the partial phase inversion of the color burst signal used for APC.

On the other hand, when a VTR records, on a recording medium, the analog video signal into which pseudo sync signals have been inserted or which has been subjected to color burst signal phase inverting control in the playback VTR as described herein above, proper gain control or phase control based on the input signal cannot be performed, and so the video signal is not correctly recorded. Even if this signal is played back, therefore, normal picture and sound cannot be obtained.

In the case of a digitized video signal, for example, in a digital VTR, an anti-duplication signal or an anti-duplication control signal comprising, for example, a duplication ranking control code, is added as digital data to the video signal and recorded on the recording medium, so as to prevent or control duplication.

In this case, the playback digital VTR reads the video signal, audio signal and anti-duplication control signal, and supplies them as digital or analog data to a recording digital VTR.

In the digital VTR being used as a recording device, the anti-duplication control signal is extracted from the supplied playback signal, and recording of the playback signal is then controlled based on the anti-duplication control signal. For example, when the anti-duplication control signal comprises an anti-duplication signal, the recording VTR does not perform recording.

Alternatively, when the anti-duplication control signal comprises a copy ranking control code, recording is controlled by this ranking control code. For example, when the copy ranking code limits duplication to one copy, the digital VTR used for recording adds this anti-duplication code before recording the video signal and audio signal on the recording medium as digital data. It is thereafter impossible to duplicate the video signal from the copy.

Hence, in the case of a digital connection when the video signal, the audio signal, and the anti-duplication control signal used as digital signals are supplied to the digital VTR used as a recording device, anti-duplication control is performed on the recording side using the anti-duplication control signal by supplying this signal to the digital VTR as digital data.

However, in the case of analog connection where the video signal and audio signal are supplied as analog signals, D/A conversion of the signal supplied to a recording device causes the loss of the anti-duplication control signal. Hence, in the case of an analog connection, an D/A converted anti-duplication control signal must be added to the D/A converted video signal or audio signal, and such addition results in deteriorated video signal or audio signal.

It is, therefore, difficult to add a D/A converted anti-duplication control signal and to extract it in the recording device for the purpose of anti-duplication control, without causing deterioration of the D/A converted video signal or audio signal.

Conventionally, therefore, in the case of an analog connection, duplication was prevented by an anti-duplication method using a difference in AGC, or a difference in APC characteristics, between the VTR and the monitor receiver.

However, in some cases, when anti-duplication is prevented using the above-mentioned difference in AGC or a difference in APC characteristics between the VTR and the monitor receiver, depending on the type of AGC or APC characteristics on the recording side, the video signal may nevertheless be correctly recorded, in this case, it might happen that duplication cannot be prevented, or that the played back image on the monitor receiver is distorted. Further, it was troublesome to change over the anti-duplication method depending on whether there is an analog connection or a digital connection.

To solve such problem, the inventors of the present invention previously proposed the method that spectrally spread anti-duplication control signal is superimposed on the video signal (Japanese Patent Application No. Hei 7-39959) as an anti-duplication method which is effective for both analog connection and digital connection without causing deterioration of played back image and sound.

According to this method, in the playback device side, a PN (Pseudorandom Noise) sequence code (referred to hereinafter as PN code) used as a spread code is generated frequently with a sufficiently short period and spectrally spread by multiplying it by the anti-duplication control signal. In this way, a narrow bandwidth, high level anti-duplication control signal is converted to a wide band, low level signal which does not affect the video signal or sound signal. This spectrally spread anti-duplication control signal is then superimposed on the video signal supplied to the recording medium, and outputted.

On the other hand, in the recording side, a PN code having the same timing and phase as the PN code used for spectral spreading in the playback device relative to the video signal supplied by the playback device is generated, and the generated PN code is multiplied by the video signal on which the anti-duplication control signal is superimposed so that the original anti-duplication control signal is extracted, that is, so that inversion spectral spreading is performed. Anti-duplication is then controlled based on the anti-duplication control signal extracted by inversion spectral spreading.

In this way, the anti-duplication control signal is spectrally spread and superimposed on the video signal as a wide band, low level signal in the playback device. It is therefore difficult for a person who wishes to illegally duplicate the video signal, to remove the anti-duplication control signal which is superimposed on it.

However, it is possible to detect and use the superimposed anti-duplication control signal by inversion spectral spreading. This anti-duplication control signal is therefore supplied to the recording device together with the video signal. In the recording side, the anti-duplication control signal is detected, and duplication is consistently controlled according to the detected anti-duplication control signal.

According to this method, as described herein above, the spectrally spread anti-duplication control signal is superimposed as a wide band, low level signal on the video signal, but it must be superimposed at a lower S/N ratio than that of the video signal in order for the video signal not to cause deterioration of the video signal.

To superimpose the spectrally spread anti-duplication control signal at a lower S/N ratio than that of the video signal, and to be able to detect the anti-duplication control signal superimposed on the video signal in the recording device, the number of the PN codes (PN code length) required to spectrally spread a one bit anti-duplication control signal must be sufficiently large. The PN code length per bit of the anti-duplication control signal may also be expressed as a spread gain (spread factor) which is the ratio (T/TC) of a time width T per bit of the anti-duplication control signal and a time width TC of one part (one chip) of the PN code. As described hereinafter, this spread gain is found from the S/N ratio of the information signal on which the anti-duplication control signal is superimposed, in this case the S/N ratio of the video signal.

For example, when the S/N ratio of the video signal on which the anti-duplication control signal is superimposed is 50 dB, the anti-duplication control signal which is spectrally spread and superimposed on the video signal must be superimposed at a lower level than 50 dB, which is the S/N ratio of the video signal. Also, in order to detect the anti-duplication control signal superimposed on the video signal, its S/N ratio must be sufficient for the spectrally spread signal to be fully demodulated. If this S/N ratio is 10 dB, a spread gain of 60 dB ((S/N ratio of 50 dB for video signal)+(S/N ratio of 10 dB necessary for detection)) is required. In this case, the PN code length per bit of the anti-duplication control signal is 1 million code length.

The method used in the recording device to detect the PN code superimposed on the video signal uses a matched filter or a sliding correlation. In the former case, the PN code is detected quickly, but only a short code length can be detected. At present, this code length is of the order of 256, and when the PN code length is 1 million per bit of the anti-duplication control signal, it cannot be detected. In the latter case, PN codes of long length can be detected but the detection takes a long time. It can thus be anticipated that a considerable time is required to detect a PN code having a length of 1 million.

Moreover, in the case that the spectrally spread anti-duplication control signal is superimposed on a video signal and supplied to a recording device using a PN code having a code length which can not be detected by means of a matched filter, it takes a long time for detecting the anti-duplication control signal in the recording device side, the long time for detection is inconvenient.

An anti-duplication method as described herein under is considered effective in the case of a recording device which duplicates a video signal on which a spectrally spread anti-duplication control signal is superimposed. The recording device starts first recording processing regardless of an anti-duplication control signal, and simultaneously detects the anti-duplication control signal superimposed on the video signal, after detecting the anti-duplication control signal, duplication control is performed based on the detected anti-duplication control signal.

In this case, it is possible to record the video signal normally at least until the anti-duplication control signal is detected. As the result, the initial portion of the video signal is undesirably duplicated though the anti-duplication control signal is a signal to inhibit duplication. Therefore, in the case that detection of the anti-duplication control signal requires several seconds to several ten seconds, it is possible to duplicate a whole video signal by repeating recording processing a plurality of times though the video signal is inhibited to be duplicated.

To solve such problem, it is considered conversely that first an anti-duplication control signal is detected and then duplication control is performed based on the detected anti-duplication control signal.

However, in this case, though there is no problem when the anti-duplication control signal is a signal for inhibiting duplication of the video signal, but when the anti-duplication control signal is a signal for permitting duplication of the video signal, recording is not operated until the anti-duplication control signal is detected, hence the initial portion of the video signal to be recorded normally is not recorded.

Not only in the case that an anti-duplication control signal on which a spectrally spread video signal is superimposed is detected for duplication control as described herein above but also, for example, in the case that an anti-duplication control signal added to a video signal is extracted in the recording device and duplication control is performed depending on the extracted anti-duplication control signal, undesirable recording of the initial portion of the video signal for inhibited duplication and unpreferable blank recording of the initial portion of the video signal for permitted duplication are problems.

In view of the above-mentioned problems, it is the object of the present invention to provide a method and device for information duplication prevention which are capable of eliminating such problems and performing duplication control consistently and adequately.

SUMMARY OF THE INVENTION

To solve the above-mentioned problems, the method for information duplication prevention in accordance with the present invention involves a method that an information signal and anti-duplication control signal are transmitted, and duplication prevention control of the information signal is performed, wherein the anti-duplication control signal is transmitted prior to transmission of said information signal, the anti-duplication control signal transmitted prior to transmission of the information signal is received, the condition for performing duplication prevention control of the subsequent information signal is arranged based on the received anti-duplication control signal, and the duplication prevention control is performed when the information signal is received.

According to the information duplication prevention method described in the claim 1 in accordance with the present invention, an anti-duplication control signal for preventing duplication of the information signal is outputted prior to transmission of the information signal such as video signal. In the reception side of the information signal, prior to reception of the information signal, the condition for performing duplication prevention control of the subsequent information signal is arranged based on the previously received anti-duplication control signal, and duplication prevention control on the information signal can be performed immediately when the information signal is supplied.

Hence, the trouble that, though the received anti-duplication control signal is a signal which indicates duplication inhibition of the information signal, the information signal which is received together with the anti-duplication control signal is duplicated, or conversely, though the received anti-duplication control signal is a signal which indicates duplication permission of the information signal, the information signal can not be duplicated, until the anti-duplication duplication control signal is detected in the reception side, such trouble happens in the case that the information signal and anti-duplication control signal are transmitted together, is prevented.

DETAILED DESCRIPTION OF THE PREFERRED EMBODIMENTS

An embodiment of the method and device for information duplication prevention in accordance with the present invention will be described hereinafter in detail with reference to the drawings.

The information duplication prevention system comprising an information output device and information recording device described hereinafter is a system to which the information duplication prevention method in accordance with the present invention is applied. In the description of the embodiment, the information input device and information recording device which are both applied to a recording playback device (refer to as DVD device hereinafter) for a DVD (digital video disk) are described for description. To simplify the description, description for the audio signal system is omitted.

[The First Embodiment]

Figure 1:
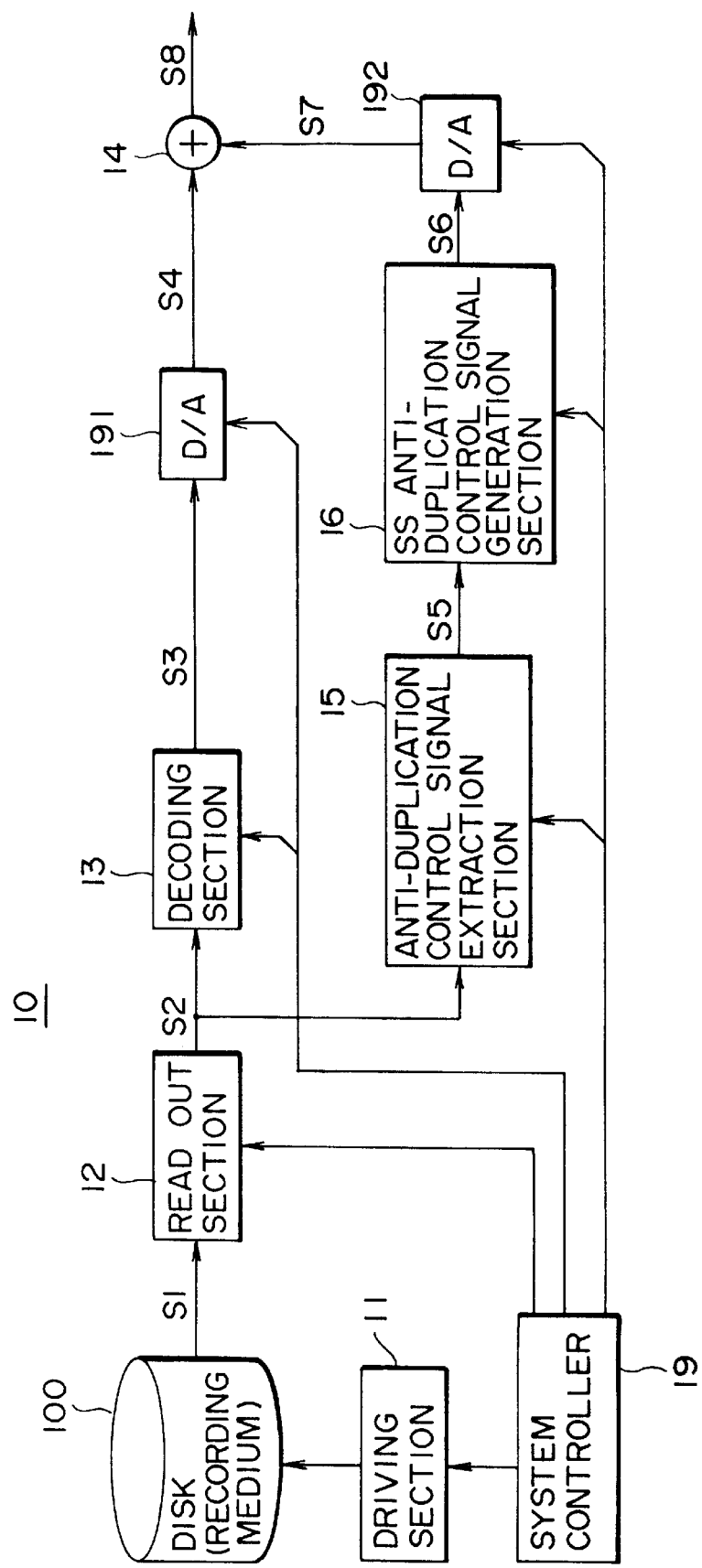
FIG. 1 is a block diagram for illustrating one embodiment of the information output device as an information duplication prevention device in accordance with the present invention.

FIG. 1 is a block diagram for illustrating an information output device (refer to simply as output device hereinafter) 10 of the first embodiment. The output device 10 is equivalent to a playback system of a DVD decide in the first embodiment.

In FIG. 1, digitized video signals and audio signals are recorded on a disk 100, and also anti-duplication control signals are recorded on the disk 100 as additional information, the disk is a DVD in this example. The anti-duplication control signal may be recorded on TOC (table of contents) of innermost or outermost area of a disk or may be recorded on the track area called as directory, or further may be inserted and recorded on a separated area of the track where video data and audio data are recorded. An example described herein under is the example of the latter case, an anti-duplication control signal is read out simultaneously when the video data are read out.

In this embodiment, the anti-duplication control signal is an information which indicates inhibition or permission, or generation limitation of duplication of the video signal, and added in the video signal. The disk 100 is mounted on the output device 10, and then the signal recorded on the disk 100 is read out.

As shown in FIG. 1, the output device 10 of this embodiment is provided with a driving section 11 for driving a disk 100, read out section 12, decoding section 13, addition section 14, anti-duplication control signal extraction section 15, SS anti-duplication control signal generation section 16, system controller 19, and D/A conversion sections 191 and 192.

The system controller 19 controls all sections of the output device 10, and comprises a micro-computer having a CPU, ROM, and RAM through these are not shown in the drawing.

The driving section 11 drives the disk 100 in response to control of the system controller 19.

The read out section 12 extracts a digital played back video signal component S2 from a signal S1 obtained by playing back the information recorded on the disk 100, and supplies it to the decoding section 13 and anti-duplication control signal extraction section 15.

The decoding section 13 performs decoding processing on the digital played back video signal component S2 to generate a digital video signal S3 containing a vertical sync signal and horizontal sync signal, and supplies them to the D/A conversion circuit 191. The D/A conversion circuit 191 performs D/A conversion on the digital video signal S3 to generate an analog video signal S4. The generated analog video signal S4 is supplied to the addition section 14.

The anti-duplication control signal extraction section 15 extracts an anti-duplication control signal S5 from information data string of the digital playback video signal S2, and supplies it to the SS anti-duplication control signal generation section 16.

The SS anti-duplication control signal generation section 16 functions as a spectral spread processing means, and in this embodiment, performs spectral spreading on the anti-duplication control signal S5.

Figure 2:
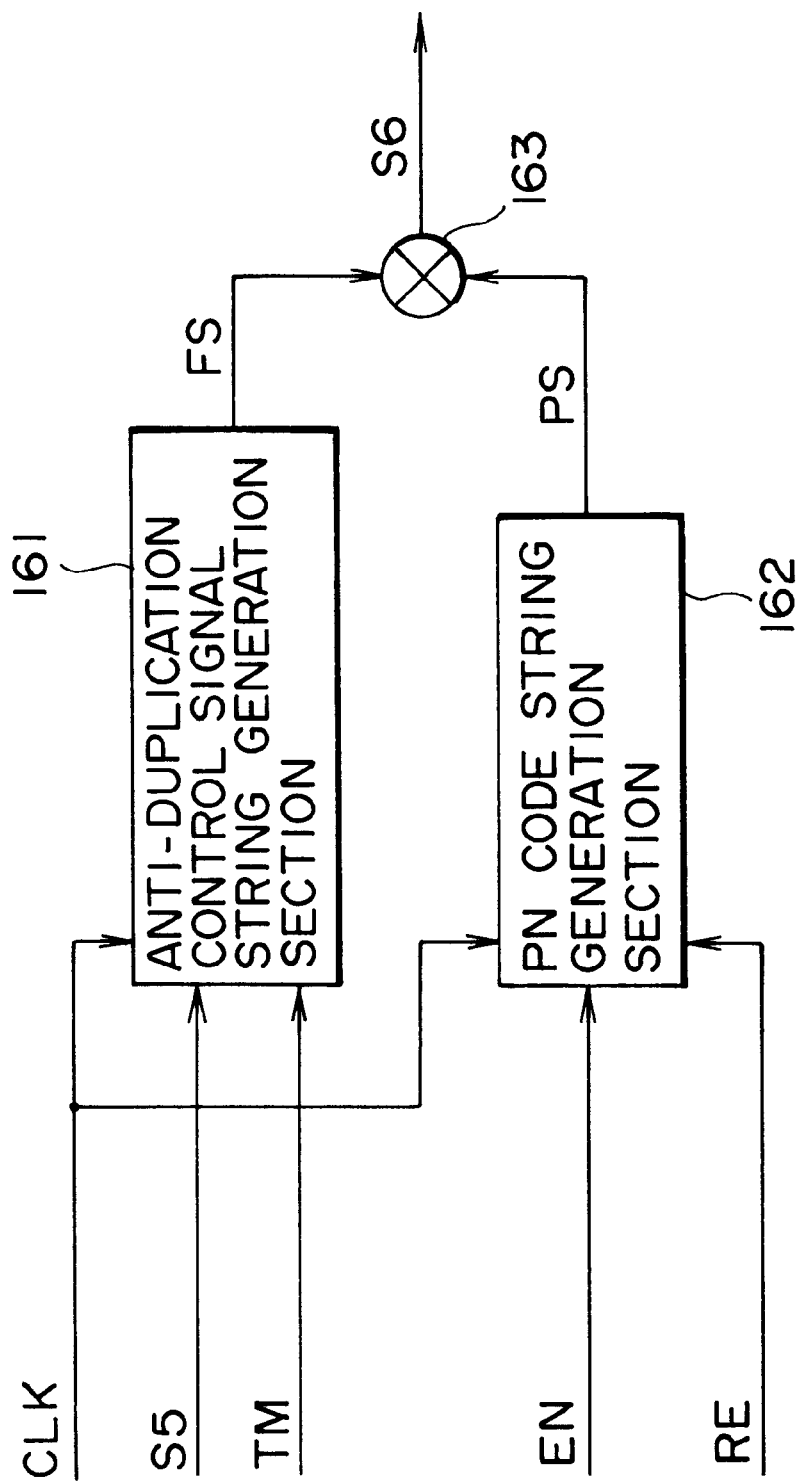
FIG. 2 is a bock diagram for illustrating the structure of the SS anti-duplication control signal generation section of the information output device shown in FIG. 1.

FIG. 2 is a block diagram for illustrating the SS anti-duplication control signal generation section 16 of the embodiment. As shown in FIG. 2, the SS anti-duplication control signal generation section 16 is provided with an anti-duplication control signal string generation section 161 and PN code string generation section 162, and multiplication section 163.

As shown in FIG. 2, a clock signal CLK, anti-duplication control signal S5, and timing signal TM are supplied to the anti-duplication control signal string generation section 161, the clock signal CLK, enable signal EN, and initialization signal RE are supplied to the PN code string generation section 162.

In this case, the timing signal TM indicates, for example, the timing of breakpoint for every one bit of the anti-duplication control signal S5. The enable signal EN is a signal to activate the PN code string generation section 162. In this first embodiment, the reset signal RE is a signal to generate a PN code string having a predetermined code pattern from the head.

The anti-duplication control signal string generation section 161 generates an anti-duplication control signal string FS by outputting every one bit a predetermined number of clocks of the anti-duplication control signal S5 and supplies it to the multiplication section 163.

The PN code string generation section 162 is activated in response to the enable signal EN. The PN code string generation section 162 generates a PN code string based on a reset signal RE from the head, and generates the PN code string PS in response to the clock signal CLK. The generated PN code string PS is supplied to the multiplication section 163.

Figure 3:
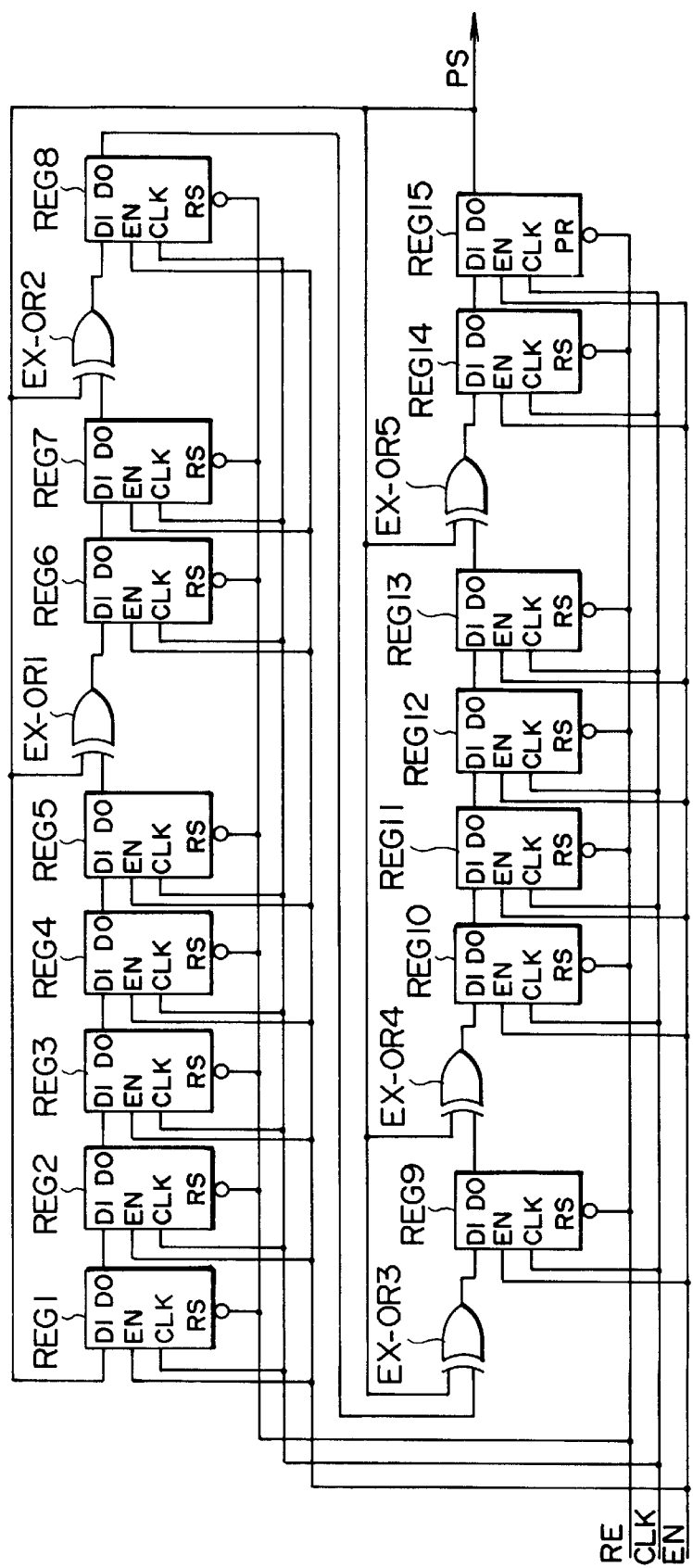
FIG. 3 is a block diagram for illustrating one example of the PN code string generation section of the SS anti-duplication control signal generation section shown in FIG. 2.

FIG. 3 is a block diagram for illustrating one example of the PN code string generation section 162 used in the first embodiment. The PN code string generation section 162 in this example comprises fifteen D-flip-flop REG1 to REG15 which are components of a 15 step shift register, and exclusive OR circuits EX-OR1 to EX-OR5 for operating a suitable tap output of the shift register. The PN code string generation section 162 shown in FIG. 3 is structured so as to generate M series of codes based on the reset signal RE, clock signal CLK, and enable signal EN as described herein above.

The multiplication section 163 performs spectral spreading on the anti-duplication control signal string FS using the PN code string PS. A wide band low level spectrally spread anti-duplication control signal (refer to as SS anti-duplication control signal hereinafter) is thereby generated and supplied to the D/A conversion circuit 192.

The D/A conversion circuit 192 converts the SS anti-duplication control signal S6 to an analog SS anti-duplication control signal S7. The analog SS anti-duplication control signal S7 is supplied to the addition section 14.

The addition section 14 receives supply of the analog video signal S4 and analog SS anti-duplication control signal S7 as described herein above, and generates and outputs an analog video signal S8 on which the analog SS anti-duplication control signal S7 is superimposed. In this case, the spectrally spread anti-duplication control signal is superimposed with a lower power than the power of the analog video signal S4.

The analog video signal S8 on which the analog SS anti-duplication control signal S7 is superimposed is supplied to a monitor receiver for displaying images and recording device for recording the video signal on the recording medium.

[Description of Operations of the Output Device 10]

When a power source is thrown in to the output device of the first embodiment, the output device drives automatically the disk 100 mounted on the output device 10 under controlling by the system controller 19, and extracts and outputs an anti-duplication control signal added in the video signal. In detail, before the video signal is played back and outputted in response to a playback indication input by a user, the anti-duplication control signal added in the video signal is automatically extracted and outputted from the video signal.

The output processing of the anti-duplication control signal performed automatically when a power source is thrown in is described with reference to a flow chart shown in FIG. 4.

Figure 4:
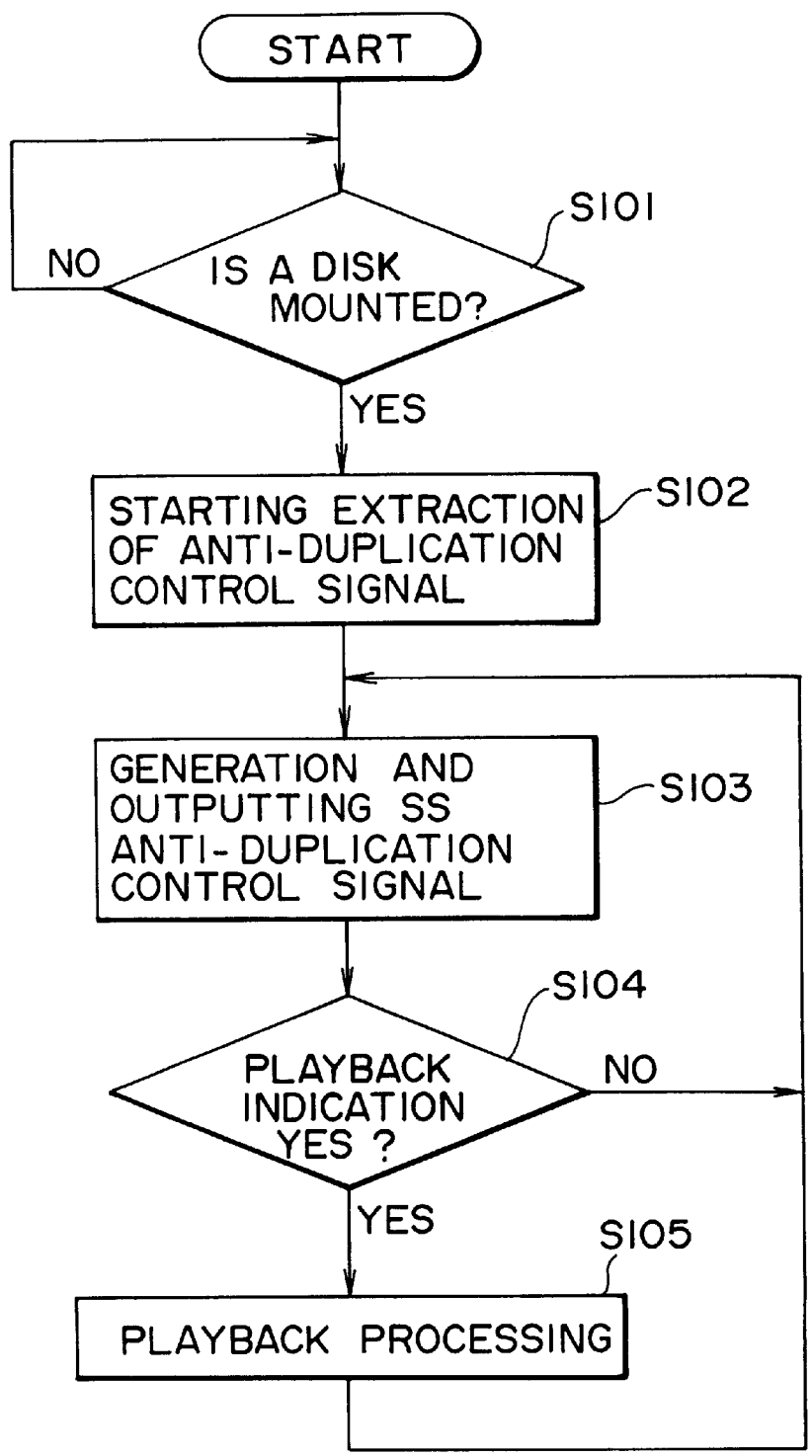
FIG. 4 is a flow chart for describing operations performed in the information output device shown in FIG. 1.

When a power is thrown in to the output device 10, the system controller 19 performs a processing shown in FIG. 4.

First, the system controller 19 judges whether a disk is mounted on the output device 10 (step 101). If a disk is not mounted, then the sequence repeats processing from the step S101.

In the judgement processing in the step S101, if the judgement is YES, the system controller 19 controls the driving section 11 to drive a disk mounted on the output device 10, namely the disk 100 in this case, and operates the read out section 12, anti-duplication control signal extraction section 15, SS anti-duplication control signal generation section, and D/A conversion circuit 192.

As described herein above, the digital played back video signal component S2 extracted by the read out section 12 is supplied to the anti-duplication control signal extraction section 15. In the anti-duplication control signal extraction section 15, a processing for extracting the anti-duplication control signal S5 from the digital played back video signal component S2 starts (step S102).

The anti-duplication control signal S5 extracted by the anti-duplication control signal extraction section 15 is supplied to the SS anti-duplication control signal generation section 16. The SS anti-duplication control signal generation section 16 performs spectral spreading on the anti-duplication control signal S5, and generates an SS anti-duplication control signal S6. The generated SS anti-duplication control signal S6 is outputted from the output device 10 through the addition section 14 (step S103).

In this case, the video signal is not outputted from the output device 10 because a playback indication is not inputted by a user. In detail, when only a power source of the output device is thrown in, a control signal is not supplied from the system controller 19 to the coding section 13 and D/A conversion circuit 191 in waiting condition for indication input such as playback indication input from a user, and decoding processing of the digital played back video signal component S2 and D/A conversion processing are not performed.

Next, the system controller 19 judges whether a user input a playback indication after a power source is thrown in (step S104). In the judgement processing of the step S104, if the judgement is NO, then the anti-duplication control signal S5 is continuously extracted, and a processing for spectrally spreading and outputting is continued.

In the judgement processing in the step S103, if the judgement is YES, then the system controller 19 operates the read out section 12, decoding section 13, addition section 14, anti-duplication control signal extraction section 15, SS anti-duplication control signal generation section 16, and D/A conversion circuits 191 and 192, and starts playback of the video signal recorded on the disk 100 from the head or from the position indicated by a user (step S105).

During a playback processing, an analog video signal S8, which is formed by superimposing the spread analog anti-duplication control signal S7 generated by extracting from the digital played back video signal component S2 and by being subjected to spectral spreading on the analog video signal S4 generated by decoding the digital played back video signal component S2 outputted from the read out section 12 and by being subjected to D/A conversion, is outputted as described herein above.

As described herein above, also during playback processing, the anti-duplication control signal extraction section 15, SS anti-duplication control signal generation section 16, and D/A conversion circuit 192 are operated, the anti-duplication control signal added to read out video signal component is extracted and spectrally spread, and the resultant signal is superimposed on the analog video signal S4 by the addition section 14, and outputted.

As described herein above, in the output device 10 of the first embodiment, prior to output of the video signal played back in response to a playback indication from a user, the anti-duplication control signal added to the video signal is extracted and spectrally spread, and outputted.

The anti-duplication control signal recorded on a disk which is likely played back may be extracted and outputted, by performing the processing shown in FIG. 4 while so called input waiting condition, for example, after exchanging the disk, replacing the disk, or stopping playback processing.

Next, the information recording device for receiving the output signal from the above-mentioned output device 10 and recording the information is described.

Figure 5:
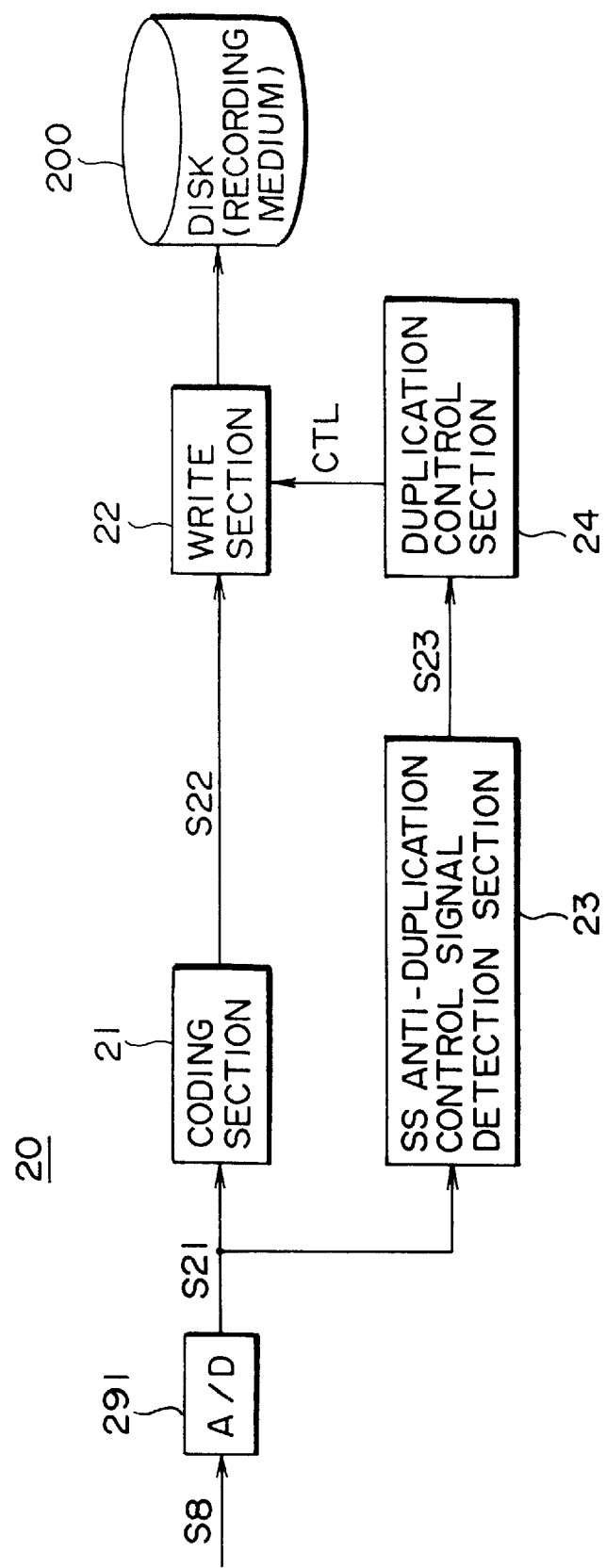
FIG. 5 is a block diagram for illustrating the information recording device as an information duplication prevention device in accordance with the present invention.

FIG. 5 is a block diagram for illustrating the information recording device (refer to simply as recording device hereinafter) 20 used for the information duplication prevention system of the present invention. In other words, the recording device 20 is equivalent to a recording system of a DVD device in the first embodiment.

The recording device 20 of the first embodiment is provided with a coding section 21, write section 22, SS anti-duplication control signal detection section 23, duplication permission/inhibition control section (refer to as duplication control section hereinafter) 24, and A/D conversion circuit 291 as shown in FIG. 5. A disk 200 is a DVD on which video signals are to be written by the recording device 20.

From the output device 10, the analog video signal S8 on which the spectrally spread anti-duplication control signal is superimposed or the anti-duplication control signal spectrally spread prior to output of the video signal is outputted as an analog signal as described herein above. In the description of the recording device 20 hereinafter, an example that the analog video signal S8 is received is described first.

The analog video signal S8 supplied from the output device 10 is subjected to A/D conversion in the A/D conversion circuit 291, and supplied to the coding section 21 and SS anti-duplication control signal detection section 23 as a digital video signal S21.

The coding section 21 receives supply of the digital video signal S21, and performs coding processing such as removing the video sync signal and data compression of the digital video signal to generate a recording digital video signal S22, and supplies it to the write section 22.

The SS anti-duplication control signal detection section 23 extracts the anti-duplication control signal which is spectrally spread and superimposed on the digital video signal S21. In other words, the SS anti-duplication control signal detection section 23 functions as an inversion spectral spreading processing means for performing inversion spectral spreading and extracting the anti-duplication control signal superimposed on the digital video signal S21.

Figure 6:
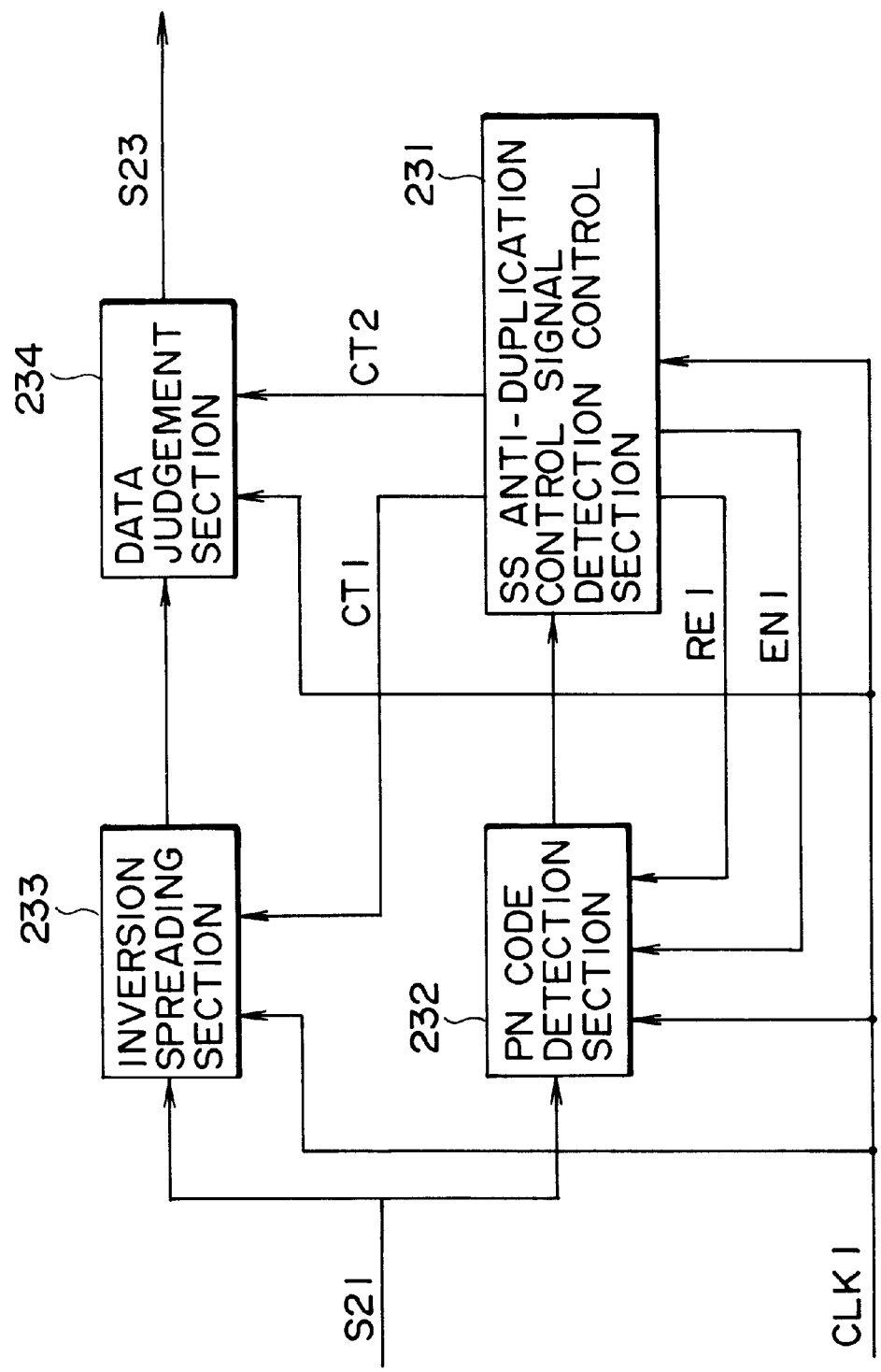
FIG. 6 is a block diagram for illustrating the SS anti-duplication control signal detection section of the recording device 20 shown in FIG. 5.

FIG. 6 is a block diagram for illustrating the structure of the SS anti-duplication control signal detection section 23 of the recording device of the first embodiment. As shown in FIG. 6, the anti-duplication control signal detection section 23 of this example is provided with an SS anti-duplication control signal detection control section 231, PN code detection section 232 for detecting PN code used for spectrally spreading the anti-duplication control signal, inversion spreading section 233 for extracting the spectrally spread anti-duplication control signal from the supplied digital signal S21, and data judgement section 234 for restoring the anti-duplication control signal extracted by the inversion spreading section 233 to an original anti-duplication control signal.

As shown in FIG. 6, the SS anti-duplication control signal detection control section 231 receives supply of the clock signal CLK1 used in the recording device 20, generates an enable signal EN1 and reset signal RE1, and supplies them to the PN code detection section 232 to control detection processing of the PN code which is served to perform spectral spreading on the anti-duplication control signal.

In this embodiment, the PN code detection section 232 is structured by using, for example, a sliding correlator. The PN code detection section 232 is activated in response to the enable signal EN1, and generates a PN code string every timing in response to the reset signal RE1 based on the clock signal CLK1.

The PN code detection section 232 detects the PN code string which spectrally spreads the anti-duplication control signal by determining the correlation between the generated PN code string and the PN code string which spectrally spreads the anti-duplication control signal.

The PN code detection section 232 determines the correlation between the PN code string generated in the PN code detection section 232 and the PN code string which spectrally spreads the anti-duplication control signal, and as the result, if the correlation is high, then the PN code detection section outputs a high level signal, and if the correlation is low, then the PN code detection section outputs a low level signal.

The SS anti-duplication control signal detection control section 231 receives a signal which indicates the determined correlation result from the PN code detection section 232, if the signal has a level higher than a predetermined level, it indicates the condition that the PN code string which spectrally spreads the anti-duplication control signal synchronizes with the PN code string generated in the PN code detection section 232, and the SS anti-duplication control signal detection control section 231 judges the detected PN code string to be the PN code string which spectrally spreads the anti-duplication control signal. Conversely, if the signal has a level lower than a predetermined level, the SS anti-duplication control signal detection control section 231 judges that the PN code string which spectrally spreads the anti-duplication control signal does not synchronize with the PN code string generated in the PN code detection section.

If the PN code string which spectrally spreads the anti-duplication control signal is not detected in the PN code detection section 232, the phase of the PN code string generated in the PN code detection section 232 is adjusted, and detection processing of the PN code string is repeated.

On the other hand, if the PN code string which spectrally spreads the anti-duplication control signal is detected in the PN code detection section, the SS anti-duplication control signal detection control section 231 generates a CT1 signal for controlling the generation start timing of the PN code in the inversion spreading section 233, and supplies it to the inversion spreading section 233. Also, the SS anti-duplication control signal detection control section 231 generates CT2 signal for controlling the data judgement section 234, and supplies it to data judgement section 234.

The inversion spreading section 233 is provided with a PN code generator and multiplication circuit though they are not shown in the drawing. The inversion spreading section 233 generates the PN code string every timing indicated by the CT1 signal from the SS anti-duplication control signal detection control section in response to the clock signal CLK1. The inversion spreading section 233 performs inversion spectral spreading using the generated PN code string, and extracts the anti-duplication control signal which was converted to wide band low level signal like the original anti-duplication control signal which is a narrow band high level signal. The extracted anti-duplication control signal is supplied to the data judgement section 234.

The data judgement section 234 restores the extracted anti-duplication control signal to the original anti-duplication control signal S23, and supplies it to the duplication control section 24.

The PN code generator for generating a PN code string in the PN code detection section 232 and inversion spreading section 233 of the SS anti-duplication control signal detection section 23 shown in FIG. 6 has the same structure as used for the PN code generator shown in FIG. 3 used in the SS anti-duplication control signal generation section 16 of the output device 10 described herein before.

The duplication control section 24 generates a control signal CTL for controlling the write section 22, and supplies it to the write section 22. The control signal CTL controls permission or inhibition of writing of the video signal S22 on the disk 200.

The write section 22 writes the digital video signal S22 on the disk 200 if the control signal CTL from the duplication control section 24 is a signal for permitting duplication, and the write section 22 does not write the digital video signal on the disk 200 if the control signal CTL is a signal for inhibiting duplication.

As described herein before, the output device 10 of the first embodiment extracts anti-duplication control signal added to the video signal prior to outputting of the video signal to be played back, and spectrally spreads and outputs it. In this case, the video signal is not outputted as described herein above.

Accordingly, the recording device 20 can receive the anti-duplication control signal added to the video signal recorded on the disk mounted on the output device 10 prior to reception of the video signal from the output device 10.

In this case, in the recording device 20, the anti-duplication control signal is detected by performing inversion spectral spreading as described herein above, and the condition for performing subsequent duplication prevention control of the video signal can be arranged corresponding to the detected anti-duplication control signal.

Hence, the recording device 20 can immediately perform duplication prevention control corresponding to the anti-duplication control signal previously received when receiving supply of the video signal played back by the output device 10.

Therefore, if the anti-duplication control signal received previously is a signal for indicating permission of duplication, then the received video signal can be recorded on the disk 200 without head loss. On the other hand, if the anti-duplication control signal is a signal for indicating inhibition of duplication, then the video signal can not be duplicated from the head.

[Modified Example of the First Embodiment]

In the output device 10 of the above-mentioned first embodiment, as shown in FIG. 1, the case that by providing D/A conversion circuits 191 and 192 in the front end of the addition section 14, the analog SS anti-duplication control signal S7 is superimposed on the analog video signal S22 is described, however the present invention is by no means limited to the case.

Figure 7:
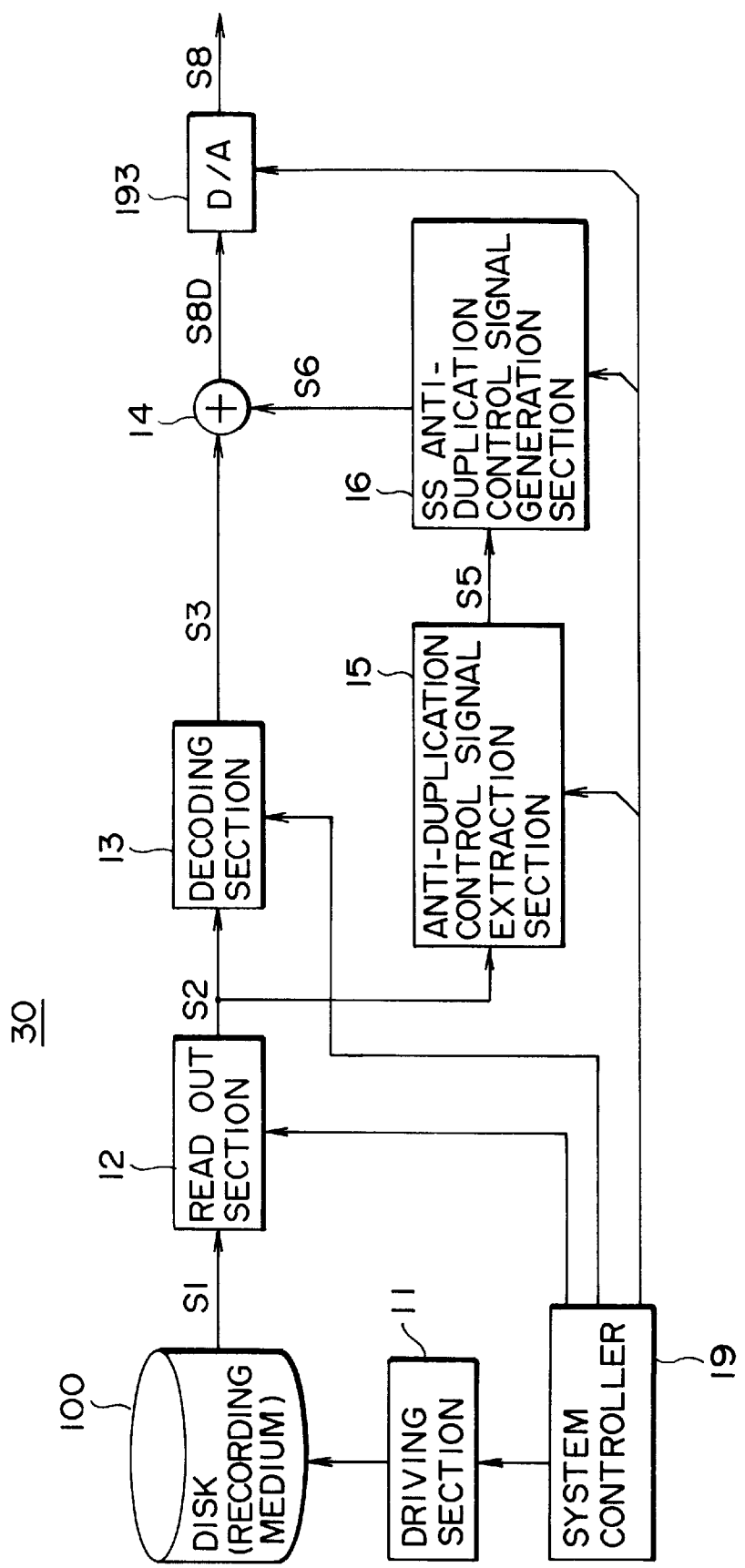
FIG. 7 is a block diagram for illustrating another example of the information output device as an information duplication prevention device in accordance with the present invention.

For example, as shown in FIG. 7, an output device 30 provided with a D/A conversion circuit 193 in the rear end of the addition section 14 may be used. In this case, as shown in FIG. 7, the addition section 14 adds the digital SS anti-duplication control signal S6 to the digital video signal S3 to generate a digital video signal S8D. The digital video signal S8D is supplied to the D/A conversion circuit 193, and subjected to D/A conversion to generate an analog video signal S8.

As described herein above, D/A conversion may be performed subsequent to superimposition processing in the addition section 14. In this case, only one D/A conversion circuit is sufficient for operation of the system.

Further, in the recording device 20 of the above-mentioned first embodiment, as shown in FIG. 5, the digital video signal S21 is supplied to the SS anti-duplication control signal detection section 23 subsequent to A/D conversion, however, the present invention is by no means limited to this case.

Figure 8:
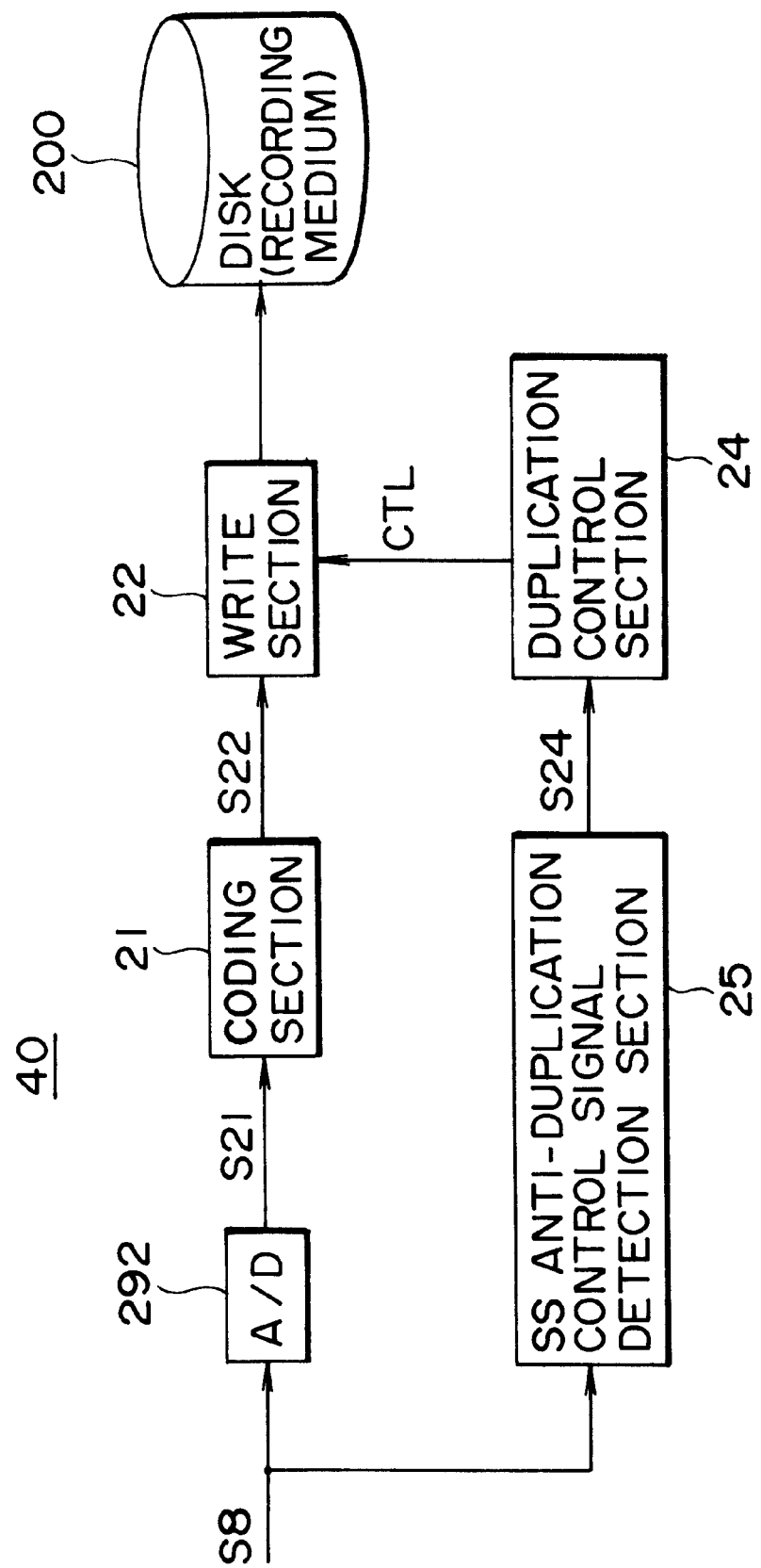
FIG. 8 is a block diagram for illustrating another example of the information recording device as an information duplication prevention device in accordance with the present invention.

For example, as shown in FIG. 8, a recording device 40 in which an analog video signal is supplied to the SS anti-duplication control signal detection section 25 prior to A/D conversion may be used.

In this case, the analog video signal S8 supplied from the output device 10 or output device 30 is supplied to the A/D conversion circuit 292 and SS anti-duplication control signal detection section 25. The SS anti-duplication control signal detection section 25 detects the spectrally spread anti-duplication control signal superimposed on the analog video signal S8.

In other words, the SS anti-duplication control signal detection section 25 functions as an inversion spectral spreading means for detecting the anti-duplication control signal spectrally spread and superimposed on the supplied signal like the SS anti-duplication control signal detection section 23 of the above-mentioned recording device 10.

The detected anti-duplication control signal S24 is supplied to the duplication control section 24. The duplication control section 24 generates a control signal CTL for controlling the write section 22 as described herein above, and supplies it to the write section 22.

As described herein above, by using the SS anti-duplication control signal detection section capable of detecting the anti-duplication control signal superimposed on the analog video signal, the anti-duplication control signal can be extracted from an analog video signal instead of digital video signal S21 and duplication control is performed.

[The Second Embodiment]

Figure 9:
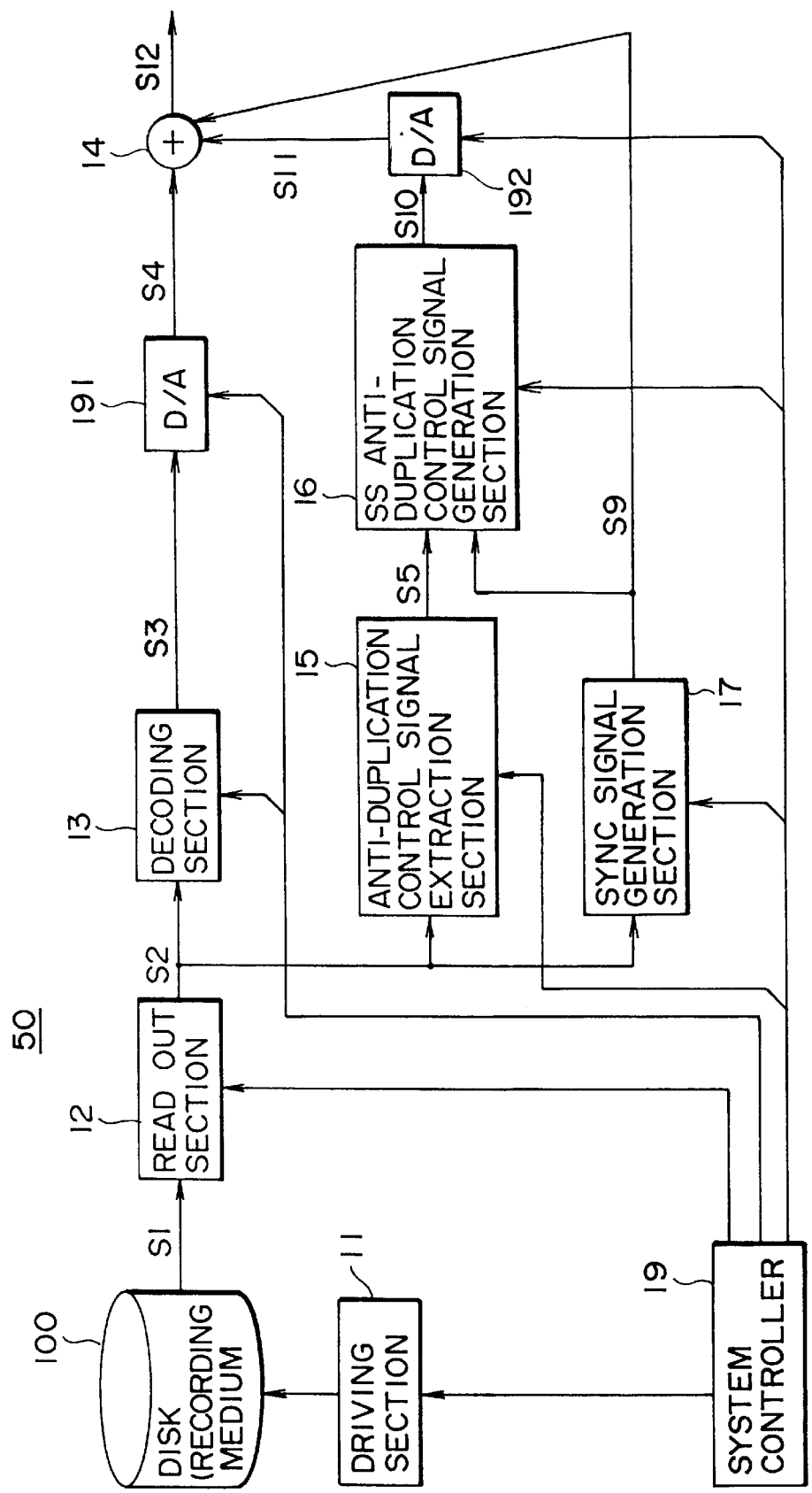
FIG. 9 is a block diagram for illustrating another example of the information output device as an information duplication prevention device in accordance with the present invention.

FIG. 9 is a block diagram for illustrating the second embodiment of an information output device as an information duplication prevention device of the present invention. As shown in FIG. 9, an output device 50 of the second embodiment is provided with a sync signal generation section 17. Components and the disk 100 excepting the sync signal generation section 17 shown in FIG. 9 have the same structure as corresponding components and the disk of the output device 10 of the above-mentioned first embodiment.

When a power source is thrown in to the output device 50, the output device 50 of the second embodiment extracts automatically an anti-duplication control signal recorded in the disk, spectrally spreads the extracted anti-duplication control signal, and output it like the output device 10 of the above-mentioned first embodiment.

As described herein before, in a recording device which receives a spectrally spread anti-duplication control signal, signal generation starts at the same timing as the PN code string used for spectral spreading and the supplied signal must be subjected to inversion spectral spreading using the PN code string having the same code pattern as the PN code string used for spectral spreading.

In the recording device 20 described herein before, the PN code detection section 232 detects the PN code string which spectrally spreads the anti-duplication control signal supplied from the output device 10, and the signal on which the anti-duplication control signal is superimposed is subjected to the processing at the same timing as that of the PN code string which spectrally spreads the anti-duplication control signal to generate a PN code string for inversion spectral spreading having the same code pattern.

As described herein above, the processing for detecting the PN code which spectrally spreads the anti-duplication control signal is a processing for synchronizing the PN code string for inversion spreading generated in the recording device with the PN code string for spreading which spectrally spreads the anti-duplication control signal. Therefore, in order to extract rapidly the spectrally spread anti-duplication control signal as the original anti-duplication control signal, it is required that the PN code string for inversion spreading generated in the recording device should be synchronized as soon as possible with the PN code string for spreading which spectrally spreads the anti-duplication control signal.

In view of the above, the output device of the second embodiment uses the sync signal (refer to PN code sync timing signal hereinafter) for synchronizing the PN code string, hence synchronizing between the PN code strings in the recording device can be performed rapidly, and the anti-duplication control signal is detected quickly.

In the second embodiment, the information signal played back from the disk 100 mounted on the output device 50 is a video signal. The digital video signal recorded in the disk 100 contains information for generating vertical sync signal and horizontal sync signal.

In the output device 50 of the second embodiment, a PN code sync timing signal is generated based on the vertical sync signal in the video signal. Herein under, the output device 50 is described with reference to an example of output processing of anti-duplication control signal which is performed automatically when a power source is thrown in to the output device 50.

When a power source is thrown in to the output device 50, the system controller 19 operates the driving section 11, read out section 12, anti-duplication control signal extraction section 15, SS anti-duplication control signal generation section 16, and sync signal generation section 17.

Further, the sync signal generation section 17 receives supply of a digital played back video signal component S2 from the read out section 12, and generates a PN code sync timing signal S9 based on the information used for generating the vertical sync signal contained in the digital played back video signal component S2. In the second embodiment, the PN code sync timing signal S9 is generated as a signal which synchronizes with the vertical sync signal and has a period of one vertical interval. The generated PN code sync timing signal S9 is supplied to the SS anti-duplication control signal generation section 16 and addition section 14.

The SS anti-duplication control signal generation section 16 has a structure shown in FIG. 2, the PN code sync timing signal S9 is supplied to the PN code generation section 162, and used as a reset signal RE.

The anti-duplication control signal generation section 16 starts generation of the signal every start timing indicated by the PN code sync timing S9, spectrally spreads the anti-duplication control signal S5 extracted by the anti-duplication control signal extraction section 15 using the PN code string generated in response to the clock signal CLK, and generates an SS anti-duplication control signal S10. The SS anti-duplication control signal S10 is converted to an analog signal S11 by the D/A conversion circuit 192, and it is supplied to the addition section 14.

The addition section 14 generates a signal S12 from the analog SS anti-duplication control signal S11 and PN code sync timing signal S9, and outputs it.

As described herein above, the signal which is synthesized from the PN code sync timing signal S9 used as a signal for indicating the generation start timing of the PN code string in the output device 50 and the SS anti-duplication control signal S11 is generated, hence the recording device can detect quickly the SS anti-duplication control signal using the PN code sync timing signal.

In other words, in the recording device, the PN code sync timing signal superimposed on the signal supplied from the output device 50 is detected, and a PN code string having the same code pattern as that of the PN code used in the output device 50 is generated every timing indicated by the detected PN code sync timing signal.

As the result, in the recording device, the same PN code string as the PN code string used in the output device 50 is generated, the generated PN code string is used for inversion spectral spreading, and then the original anti-duplication control signal before spectral spreading is thereby detected. Hence, inversion spectral spreading is performed rapidly to detect the anti-duplication control signal.

In the case that the input device 50 is brought into playback condition in response to a playback indication input from the input waiting condition while a power source was already thrown in to the output device 50 but a playback indication is not yet inputted by a user, the PN code sync timing signal S9 is superimposed on the played back video signal together with the spectrally spread anti-duplication control signal, and it is outputted.

The PN code sync timing signal S9 is a signal generated as a signal which synchronizes with the vertical sync signal in the video signal as described herein above. Therefore, in the recording device which receives supply of the video signal from the output device 50 without superimposing the PN code sync timing signal S9 on the video signal, the recording device which generates the same signal as the PN code sync timing signal S9 based on the vertical sync signal in the supplied video signal and uses it as a PN code sync timing signal may be used.

In the output device 50 described using FIG. 9, the PN code sync timing signal having one period of every one vertical interval which is synchronized with the vertical sync signal is generated, however the present invention is by not means limited to this case.

For example, a PN code sync timing signal having one period of a plurality of vertical intervals such as two vertical interval or three vertical intervals which is synchronized with the vertical sync signal may be generated, or conversely, a PN code sync timing signal having one period of one divided interval or a plurality of divided intervals each of which is generated by dividing one vertical interval into a plurality of divided intervals such as ½ vertical interval or ¼ vertical interval may be generated.

The PN code sync timing signal may be synchronized with the horizontal sync signal instead of the vertical sync signal. Also in this case, a PN code sync timing signal having one period of one horizontal interval or a plurality of horizontal intervals may be generated, or conversely, a PN code sync timing signal having one period of one divided interval or a plurality of divided intervals each of which is generated by dividing one horizontal interval into a plurality of divided intervals may be generated.

Alternately, the vertical sync signal itself or horizontal sync signal itself may be used as a PN code sync timing signal.

In the second embodiment, the PN code sync timing signal is generated as a signal which is synchronized with the video sync signal, however the present invention is by no means limited to the case. For example, the PN code sync timing signal may be generated as a signal which provides a timing previously determined by the sync signal generation section 17 of the output device 50.

In this case, even in the case that the output device 50 is brought into playback condition from waiting condition, the PN code sync timing signal is generated continuously and stably without interruption and fluctuation of period. After the output device 50 is brought into playback condition completely, the analog video signal S4 read out from the disk 100 and played back, the SS anti-duplication control signal S11, and the PN code sync timing signal S9 are all superimposed to form a signal and the signal is outputted.

In this case also, the recording device which receives supply of a signal from the output device 50 detects the PN code sync timing signal superimposed on the video signal, and generates a PN code string having the same code pattern as that of the PN code string used for spectral spreading in the output device 50 every timing indicated by the PN code sync timing signal. By performing inversion spectral spreading using this PN code string, the anti-duplication control signal which is spectrally spread and superimposed on the video signal is extracted quickly.

[The Modified Example of the Output Device of the Second Embodiment]

As shown FIG. 9, in the output device 50 of the second embodiment, the SS anti-duplication control signal which is converted to the analog signal is superimposed on the video signal which was converted previously to the analog signal using the two D/A conversion circuits 191 and 192, however the present invention is by no means limited to the case.

Figure 10:
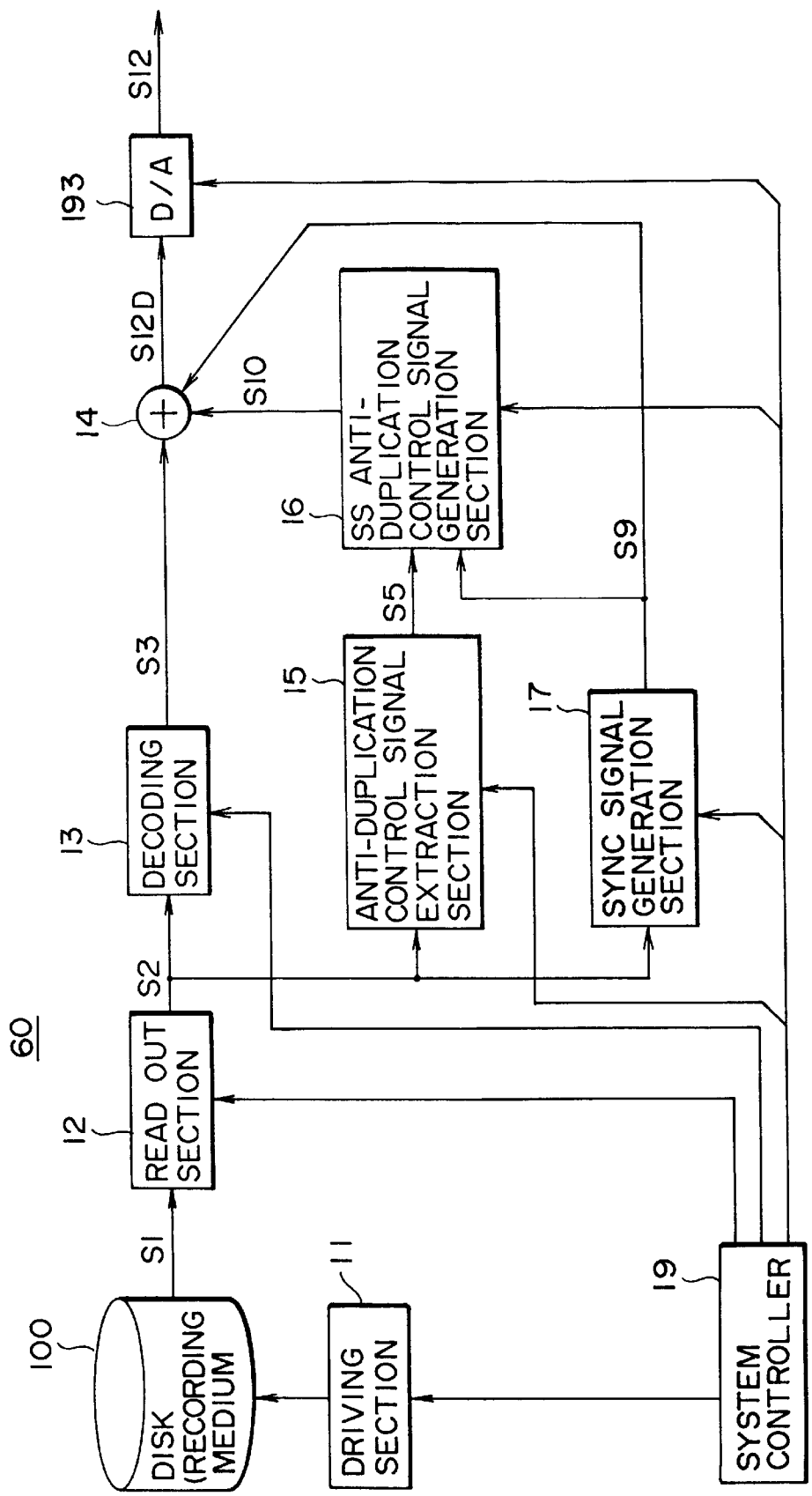
FIG. 10 is a block diagram for illustrating another example of the information output device as an information duplication prevention device in accordance with the present invention.

In detail as shown in FIG. 10, a D/A conversion circuit 193 is provided in the rear end of the addition section 14, and the digital signal S12D generated by superimposition processing in the addition section 14 may be subjected to D/A conversion. Thereby one D/A conversion circuit is sufficient for operation.

[The Third Embodiment]

Figure 11:
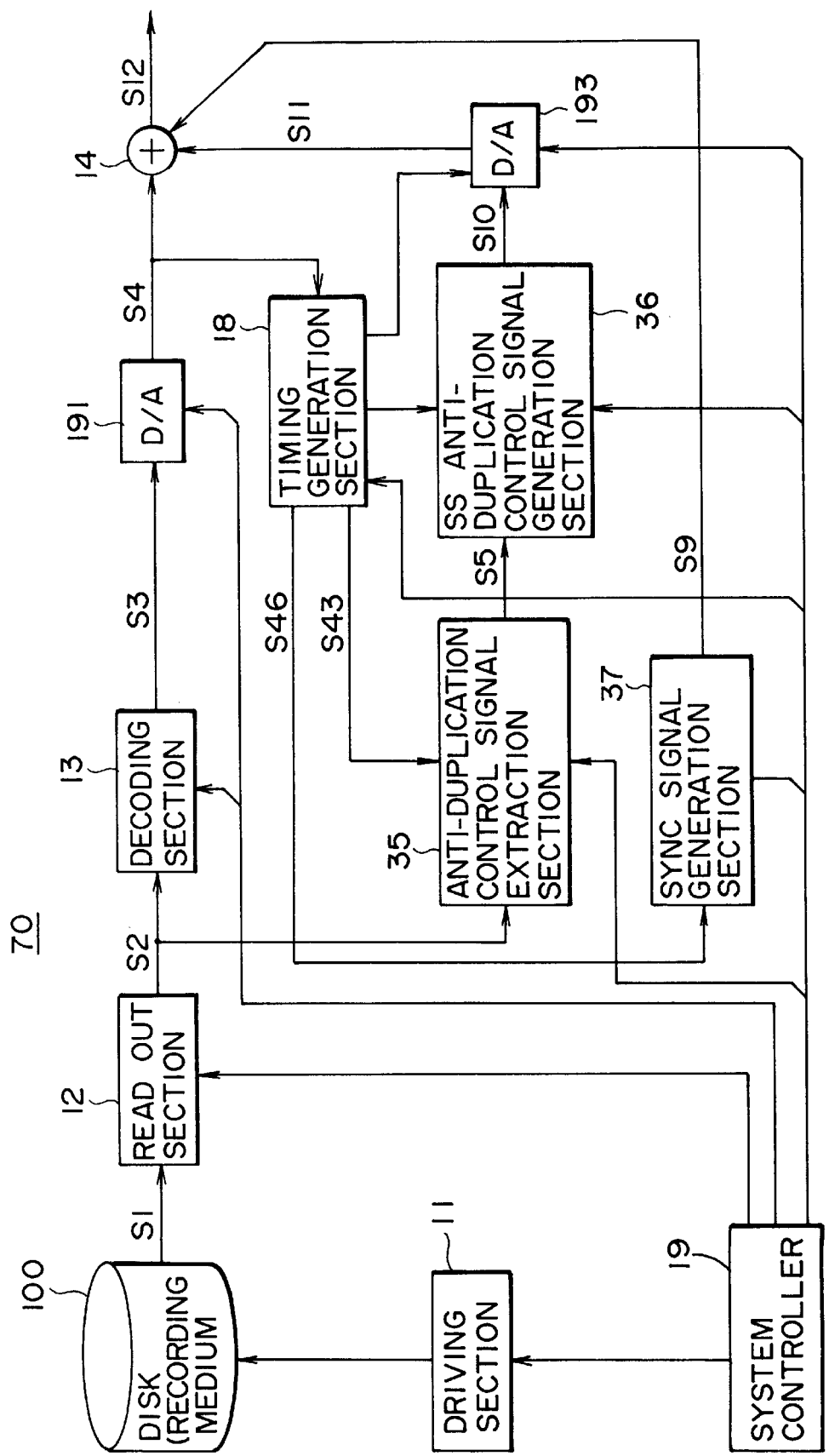
FIG. 11 is a block diagram for illustrating another example of the information output device as an information duplication prevention device in accordance with the present invention.

FIG. 11 is a block diagram for illustrating the third embodiment of an information output device used as an information duplication prevention device of the present invention.

As shown in FIG. 11, the output device 70 of the third embodiment is provided with a driving section 11, read out section 12, decoding section 13, addition section 14, anti-duplication control signal extraction section 35, SS anti-duplication control signal generation section 36, sync signal generation section 37, system controller 19, and D/A conversion circuits 191 and 193, and additionally a timing generation section 18 for generating a timing signal used for spectral spreading and clock signal.

The SS anti-duplication control signal generation section 36, sync signal generation section 37, and D/A conversion circuit 193 have the same functions as those of the SS anti-duplication control signal generation section 16, sync signal generation section 17, and D/A conversion circuit 192 of the second embodiment described herein before, excepting that the timing generation section 18 supplies a timing signal in this output device 70. The driving section 11, readout section 12, decoding section 13, addition section 14, system controller 19, D/A conversion circuit 191 and disk 100 have the same structures as those of corresponding components of the output device 50 of the second embodiment described herein before.

The output device 70 of the third embodiment extracts an anti-duplication control signal added to the video signal, spectrally spreads it and output it when a power source is thrown in to the output device 70 like the output device of the second embodiment. In this case, the video signal recorded on the disk is not outputted because a playback indication from a user is not inputted, and a spectrally spread anti-duplication control signal is outputted.

Then, the output device 70 of the third embodiment generates a timing signal used for spectral spreading of the anti-duplication control signal and a clock signal based on the video signal played back from the disk.

The timing generation section 18 receives supply of an analog video signal S4 containing the video sync signal generated through the read out section 12, decoding section 13, and D/A conversion section 191.

The timing generation section 18 generates various timing signals S43 to S46 to be supplied to the anti-duplication control signal extraction section 35, SS anti-duplication control signal generation section 36, sync signal generation section 37, and D/A conversion circuit 193 and a clock signal CLK. The various timing signal S43 to S46 generated by the timing generation section 18 are supplied to the respective components as shown in FIG. 11.

Figure 12:
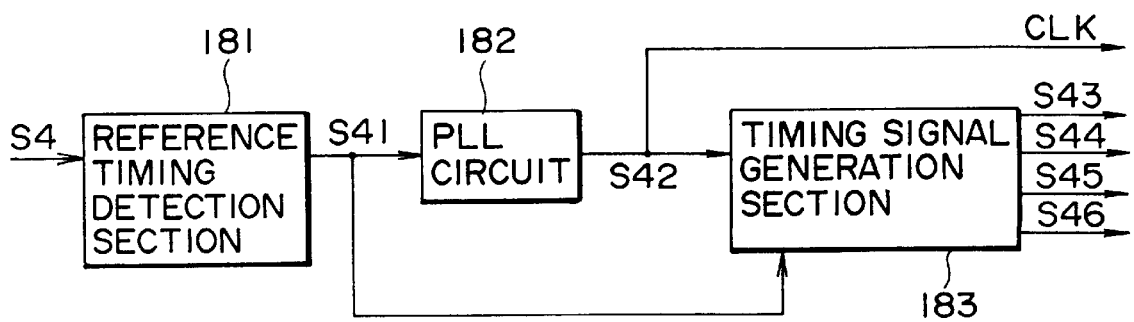
FIG. 12 is a block diagram for illustrating the timing generation section of the information output device shown in FIG. 11.

FIG. 12 is a block diagram for illustrating the timing generation section 18. As shown in FIG. 12, the timing generation section 18 is provided with a reference timing detection section 181, PLL circuit 182, and timing signal generation section 183.

The reference timing detection section 181 extracts the video sync signal as a reference timing signal from the inputted analog video signal S4. In this embodiment, the vertical sync signal is used as a reference timing signal. The reference timing detection section 181 extracts the vertical sync signal S41, and supplies it to the PLL circuit 182 and timing signal generation section 183.

The PLL circuit 182 generates a clock signal CLK synchronized with the vertical sync signal S41, and supplies it to the timing signal generation section 183 and other processing sections.

The timing signal generation section 183 generates various timing signals S43 to S46 based on the vertical sync signal S41 and clock signal CLK and outputs them.

The anti-duplication control signal extraction section 35 extracts the anti-duplication control signal S5 out of the information string of the played back video signal component S2 extracted from the read out section 12 based on the timing signal S43 from the timing signal generation section 18, and supplies it to the SS anti-duplication control signal generation section 36.

The SS anti-duplication control signal generation section 36 of the third embodiment generates a PN code string based on the timing signal S44 from the timing generation section 18 and clock signal CLK, and generates a plurality of PN code strings different in phase as described hereinafter in detail by shifting the phase of the generated PN code string. Further, the SS anti-duplication control signal generation section 36 outputs a PN code string having a phase corresponding to the anti-duplication control signal S5 from the anti-duplication control signal extraction section 35 as an SS anti-duplication control signal S10.

In detail, a PN code string different in phase is selected corresponding to the type of control, for example, if the type of control in the anti-duplication control signal S5 indicates inhibition of duplication then the PN code string having the first phase is selected, on the other hand, if the type of control in the anti-duplication control signal indicates permission of duplication then the PN code string having the second phase is selected.

In the third embodiment, the timing signal S44 is a signal which is synchronized with the vertical sync signal and has a period of one vertical interval. The SS anti-duplication control signal generation section 36 generates the PN code string of the same series every one vertical interval at the timing of the timing signal S44.

Figure 13:
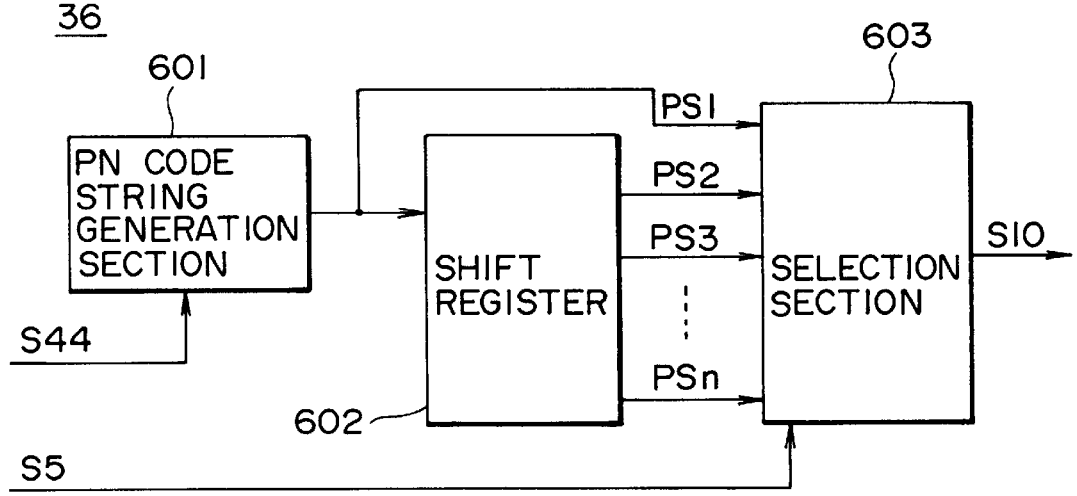
FIG. 13 is a block diagram for illustrating the SS anti-duplication control signal generation section of the information output device show n in FIG. 11.

FIG. 13 is a block diagram for illustrating the SS anti-duplication control signal generation section 36 of the third embodiment. The SS anti-duplication control signal generation section 36 in this example is provided with a PN code generation section 601, shift register 602, and selection section 603, and outputs any one of the PN code strings PS1, PS2, . . . , PSn which are different in phase as the SS anti-duplication control signal S10 corresponding to the type of the anti-duplication control signal S5 supplied form the anti-duplication control signal extraction section 35.

The PN code string generation section 601 generates a PN code string PS1 based on the timing signal S44 and clock signal CLK. The generated PN code string PS1 is supplied to the shift register 602 and the selection section 603.

The shift register 602 in the third embodiment is a shift register of (n−1) bits, shifts the input PN code PS1 to generate PN code strings PS2, PS3, . . . , PSn which are different in phase, and supplies them to the selection section 603.

The selection section 603 selects a PN code string which corresponds to the control type of the anti-duplication control signal S5 out of the PN code strings PS1, PS2, PS3, . . . , PSn, and outputs it as an SS anti-duplication control signal S10. For example, the selection section 603 outputs the PN code string PS1 if the anti-duplication control signal S5 is the information indicating inhibition of duplication, on the other hand, outputs the PN code string PS2 if the anti-duplication control signal S5 is the information indicating permission of duplication, as described herein, the selection section 603 selects and outputs the PN code string having a phase corresponding to the control type of the anti-duplication control signal S5.

The SS anti-duplication control signal S10 outputted from the SS anti-duplication control signal generation section 36 is supplied to the D/A conversion section 193, and the D/A conversion circuit 193 outputs the converted signal to the addition section 14.

As the result, when the disk 100 is played back, the analog video signal S4 and SS anti-duplication control signal S11 are superimposed each other, an analog video signal S12 on which the SS anti-duplication control signal S11 is superimposed is generated and outputted.

As described herein above, while the output device 70 of the third embodiment is in input waiting condition, the spectrally spread anti-duplication control signal is outputted from the output device 70. In this case, the video signal is not outputted until a user operates a playback indication operation and the playback indication is supplied to the system controller 19.

Hence, in the recording device which receives supply of the SS anti-duplication control signal S10 outputted while the output device 70 is in waiting condition, even if the PN code string used in the output device 70 is generated at the timing synchronized with the vertical sync signal as described herein above, the PN code string synchronized with the vertical sync signal can not be generated every same period as that of output device 70 while the video signal is not supplied to the recording device.

In view of the above, the sync signal generation section 37 generates a PN code sync timing signal S9 for synchronizing the PN code string used in the output device 70 with the PN code string to be generated in the recording device.

In the third embodiment, the sync signal generation section 37 generates a PN code sync timing signal S9 based on the timing signal S46 generated in the timing generation section 18. In this case, the timing signal S46 is a signal which provides the same timing as that of timing signal S44 supplied to the SS anti-duplication control signal generation section 36, and the signal is synchronized with the vertical sync signal and has a period of one vertical interval.

The sync signal generation section 37 generates a PN code sync timing signal S9 which is synchronized with the vertical sync signal in the analog video signal S4 and has a period of one vertical interval based on the timing signal S46 and supplies it to the addition section 14.

Hence, the PN code sync timing signal S9 is outputted together with the SS anti-duplication control signal S11 outputted while the output device 70 is in input waiting condition. In the recording device, the PN code string is generated based on the PN code sync timing signal supplied from the output device 70, a PN code string to be used in the recording device is thereby generated at the same timing as that of the PN code string used in the output device 70 in response to the PN code sync timing signal S9.

As described herein above, the anti-duplication control signal extraction section 35, SS anti-duplication control signal generation section 36, and D/A conversion circuit 193 all can control processing start timing based on the timing signals S43, S44, and S45 generated by the timing generation section 18 based on the played back analog video signal S4 and clock signal CLK. Also, the sync signal generation section 37 can generates the m PN code sync timing signal S9 based on the timing signal S46 generated by the timing generation section 18 based on the analog video signal S4.

As described herein above, the respective processes are performed using timing signals based on the played back video signal and clock signal, and therefore malfunction such as deviation of processing timing between the respective processing sections does not happen.

Next, the recording device which receives supply of output video signal from the above-mentioned output device 70 and records the video signal is described.

Figure 14:
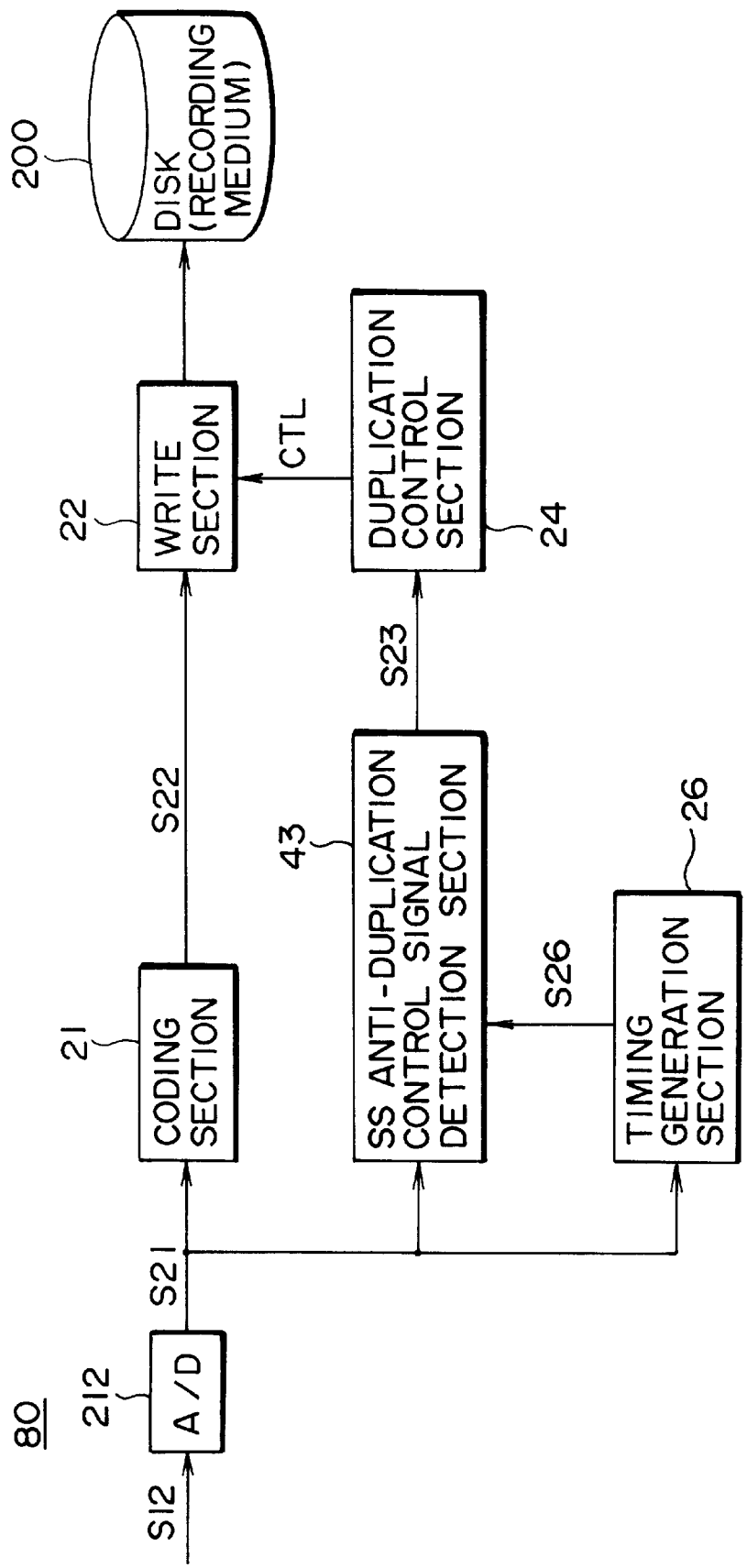
FIG. 14 is a block diagram for illustrating an example of the information recording device for receiving a signal from the information output device shown in FIG. 11.

FIG. 14 is a block diagram for illustrating the recording device 80 used for the information duplication control system of the third embodiment.

As shown in FIG. 14, the recording device of this example is provided with a coding section 21, SS anti-duplication control signal detection section 43, duplication control section 24, and A/D conversion circuit 26, and additionally a timing generation section 26.

The SS anti-duplication control signal detection 43 functions like the SS anti-duplication control signal detection section 23 of the output device 20 of the first embodiment but is different from the SS anti-duplication control signal detection section 23 of the output device 20 of the first embodiment in that the SS anti-duplication control signal detection section 43 of the recording device 80 receives supply of a timing signal from the timing generation section 26. The disk 200 is a DVD on which the recording device 80 writes a video signal.

The analog video signal S12 supplied from the output device 70 is subjected to A/D conversion by the A/D conversion circuit 291, and the converted signal is supplied to the coding section 21, SS anti-duplication control signal detection section 43, and timing signal generation section 26 as a digital video signal S21.

The coding section 21 receives the digital video signal S21, and performs coding processing such as removal of the video sync signal and data compression of the digital video signal to generate a recording digital video signal S22, and supplies it to the write section 22.

The timing generation section 26 has the same structure as that of the timing generation section 18 of the output device 70 described herein above using FIG. 12. Herein the timing generation section 26 is described as a timing generation section which has the structure described in FIG. 12.

The timing generation section 26 is provided with a reference timing detection section 181, PLL circuit 182, and timing signal generation section 183. The timing generation section 26 receives supply of the digital video signal containing the video sync signal from the A/D conversion circuit 212, and the reference timing detection section 181 extracts the vertical sync signal S41.

The PLL circuit 182 receives supply of the vertical sync signal S41 and generates a clock signal CLK. The generated clock signal CLK is supplied to the timing signal generation section 183 and also to processing sections such as the SS anti-duplication control signal detection section 43. The timing signal generation section 183 generates a timing signal S26 to be supplied to the SS anti-duplication control signal extraction section 23 based on the vertical sync signal S41 and clock signal CLK.

The SS anti-duplication control signal detection section 43 extracts the SS anti-duplication control signal contained in the signal supplied from the output device 70 based on the timing signal S26 from the timing generation section 26.

Figure 15:
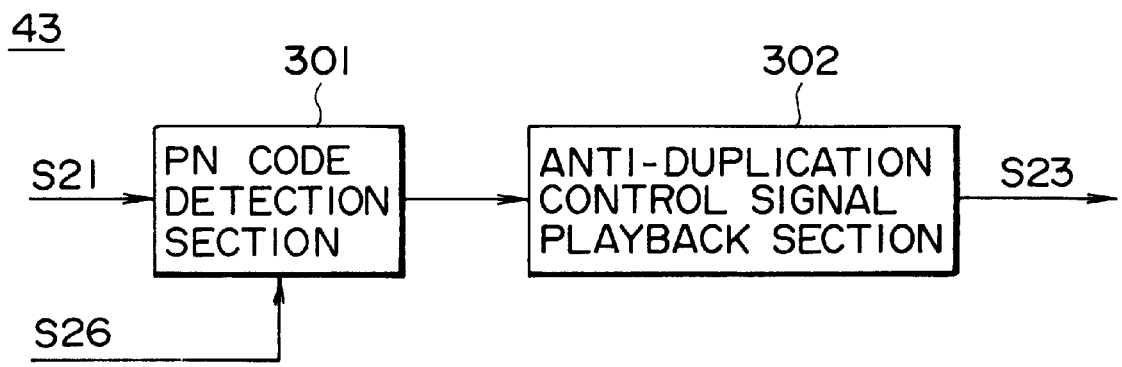
FIG. 15 is a block diagram for illustrating the SS anti-duplication control signal detection section of the information recording device shown in FIG. 12.

FIG. 15 is a block diagram for illustrating the SS anti-duplication control signal detection section of the third embodiment. The SS anti-duplication control signal detection section 43 in this case corresponds to the case that the PN code string selected correspondingly to the anti-duplication control signal out of a plurality of PN code strings which are different in phase as the SS anti-duplication control signal in the output device 70 described herein before using FIG. 13.

As shown in FIG. 15, the SS anti-duplication control signal detection section 43 of the third embodiment is provided with a PN code detection section 301 and an anti-duplication control signal playback section 302.

The PN code detection section 201 receives supply of the digital signal S21 from the A/D conversion circuit 291 and timing signal S26 from the timing generation section 26. The PN code detection section 201 detects the PN code string contained in the digital signal S21 using the PN code string generated based on the timing signal S26. Hence, the generation start timing of the PN code string contained in the digital signal S21 is detected. The phase deviation of the PN code string contained in the digital signal S21 is detected thereby, and the detected result is informed to the anti-duplication control signal playback section 302.

The anti-duplication control signal playback section 302 identifies the type of the anti-duplication control signal with reference to the difference in timing of the PN code detected by the PN code detection section 301. The anti-duplication control signal S23 identified as described herein above is supplied to the duplication control section 24.

The duplication control section 24 generates a control signal CTL for controlling the write section 22 and supplies it to the write section 22.

As the result, the write section 22 does not write the digital video signal S22 from the coding section 21 on the recording medium 200 if the control signal CTL is a signal for inhibiting duplication, and on the other hand, writes the digital video signal S22 on the disk 200 only if the control signal CTL is a signal for permitting duplication.

As described herein before, while a power source was already thrown in to the output device 70 of the third embodiment but an indication of operation is not yet inputted by a user, the output device 70 extracts automatically the anti-duplication control signal added to the video signal recorded on the disk 100, and outputs it as an SS anti-duplication control signal. In other words, the SS anti-duplication control signal is outputted prior to playback processing of the video signal corresponding to the playback indication.

Hence, duplication control is performed corresponding to the anti-duplication control signal supplied from the output device 80 before receiving the video signal from the output device 70 in the recording device 80 like in the first and second embodiments described herein before.

The timing signal S26 and clock signal to be supplied to the SS anti-duplication control signal detection section 43 are generated based on the video signal S21 like the output device 70 of the third embodiment. Therefore, the same timing that is the timing of the received video signal can be used for both input device 70 and recording device 80, and hence processing such as synchronization of the PN code string as described herein above is performed quickly.

[Modified Example of the Third Embodiment]

Figure 16:
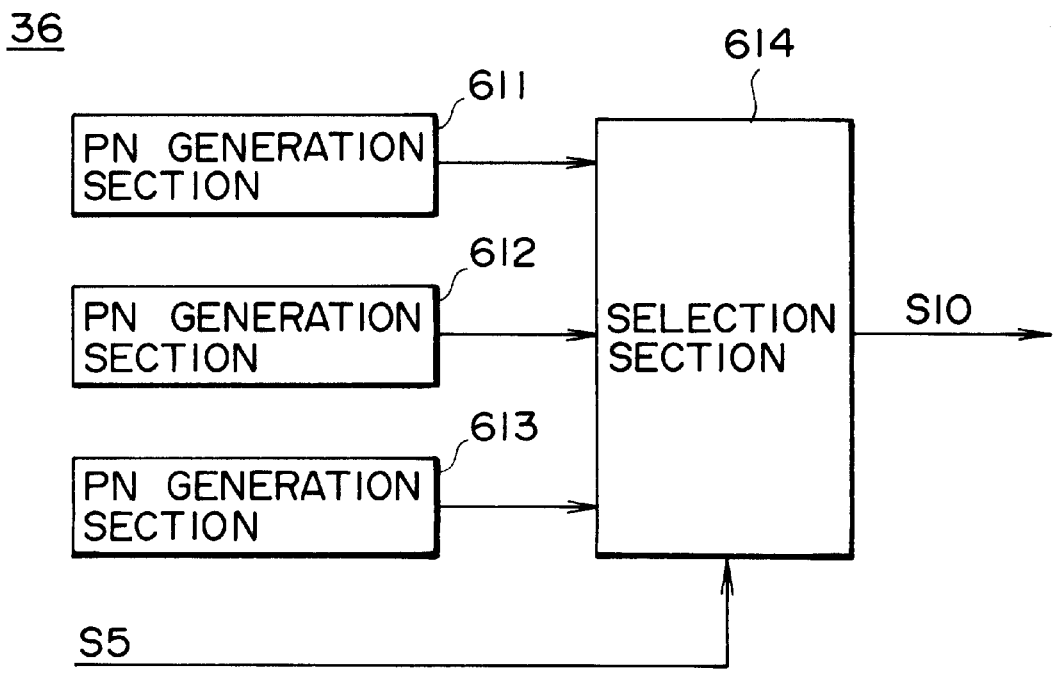
FIG. 16 is a block diagram for illustrating another example of the SS anti-duplication control signal generation section of the information output device shown in FIG. 12.

FIG. 16 is a block diagram for illustrating another example of the SS anti-duplication control signal generation section 36. The anti-duplication control signal generation section shown in FIG. 15 uses a plurality of PN code strings different in series.

The PN generation sections 611, 612, and 613 generate a PN code different in series. PN code strings generated by the PN code generation sections 611, 612, and 613 are supplied to the selection section 614.

The selection section 614 outputs a PN code string which corresponds to the control type of the anti-duplication control signal S5 out of the plurality of PN code string series.

Figure 17:
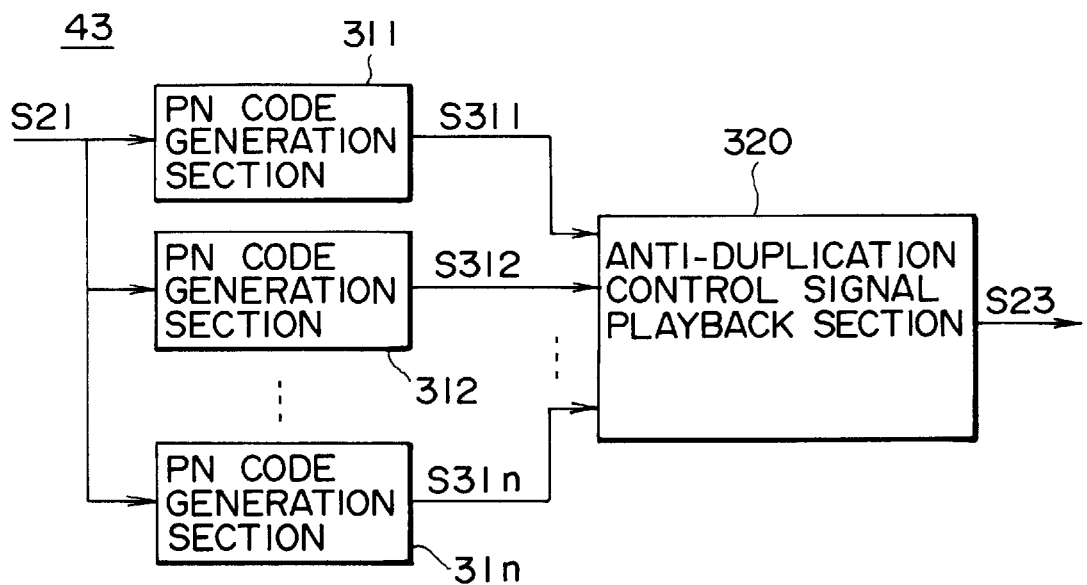
FIG. 17 is a block diagram for illustrating another example of the SS anti-duplication control signal generation detection section of the information output device shown in FIG. 14.

FIG. 17 is a block diagram for illustrating one example of the SS anti-duplication control signal detection section of the recording device side which example is corresponding to the case that the PN code string series corresponding to the control type of the anti-duplication control signal S5 out of the plurality of PN code strings different in string series shown in FIG. 16 is selected as the SS anti-duplication control signal.

The video signal on which the SS anti-duplication control signal is superimposed or a signal comprising the SS anti-duplication control signal and the PN code sync timing signal is inputted to the PN code detection sections 311, 312, . . . , 31n. The respective PN code detection sections 311, 312, . . . , 31n detect a PN code string different in series. Detection results S311, S312, . . . , S31n detected by the PN code detection sections 311, 312, . . . , 31n respectively are supplied to the anti-duplication control signal playback section 320.

The anti-duplication control signal playback section 320 judges that the PN code string of which series is to be detected based on the detection results S311, S312, . . . , S31n, and identifies the type of the anti-duplication control signal. Then the identification results is supplied to the duplication control section 24 as the signal S23.

The SS anti-duplication control signal generation section which uses a plurality of PN code strings different in series shown in FIG. 16 can be used as the SS anti-duplication control signal generation section 36 of the output device shown in FIG. 11. In this case, the SS anti-duplication control signal detection section shown in FIG. 17 is used as the SS anti-duplication control signal detection section of the recording device 80 shown in FIG. 14.

Figure 18:
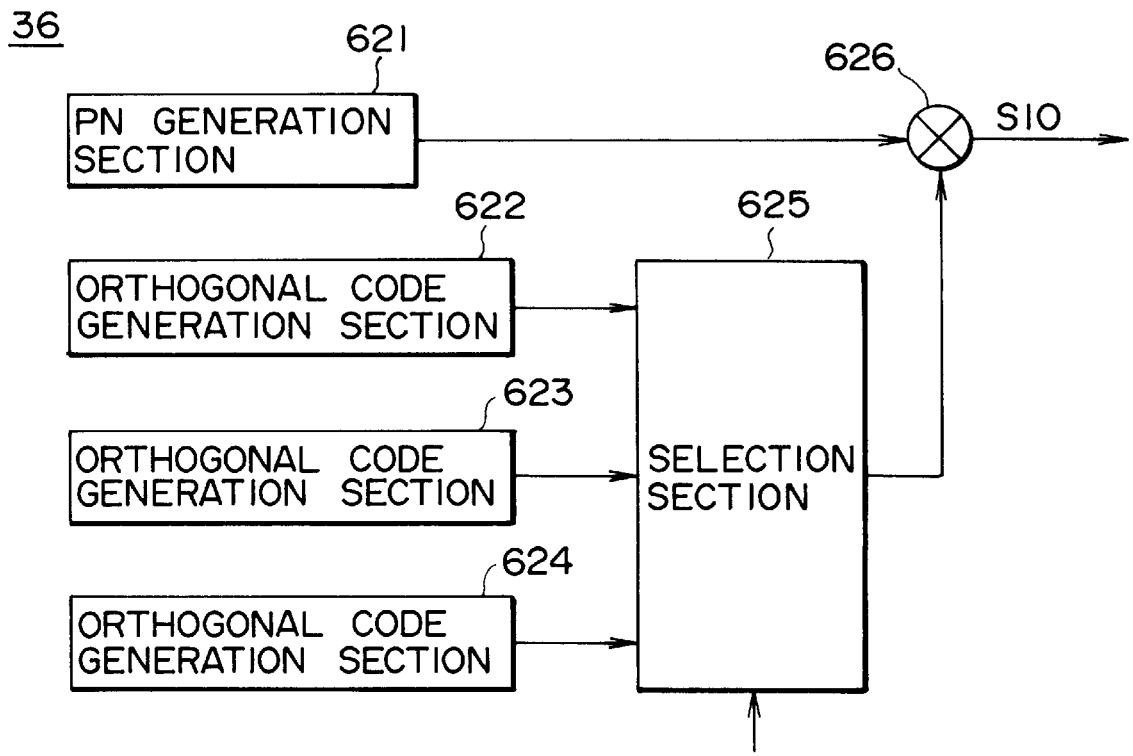
FIG. 18 is a block diagram for illustrating another example of the SS anti-duplication control signal generation section of the information output device shown in FIG. 12.

FIG. 18 is a block diagram for illustrating another example of the SS anti-duplication control signal generation section 36. The SS anti-duplication control signal generation section 36 of this example is an example of the case that one PN code string and a plurality of orthogonal code strings are used.

The PN generation section 621 generates a PN code string, and supplies it to an addition section 626. The orthogonal code generation sections 622, 623, and 624 generate different orthogonal code strings and supplies them to the selection section 625.

The selection section 625 supplies the orthogonal code string corresponding to the control type of the anti-duplication control signal S5 out of the plurality of different orthogonal code strings to an addition section 626. The addition section 626 multiplies the PN code string by the selected orthogonal code string and supplies the resultant signal to the duplication control section 24 as the SS anti-duplication control signal S10.

The SS anti-duplication control signal detection section 43 described herein above using FIG. 17 may be used as the SS anti-duplication control signal detection section 43 of the recording device side corresponding to the SS anti-duplication control signal generation section shown in FIG. 18.

In this case, PN code detection sections 311, 312, . . . , 31n respectively detect a code formed by multiplying the PN code string generated in the PN code generation section 621 shown in FIG. 18 by the respectively different orthogonal codes.

As described herein above, the SS anti-duplication control signal generation section shown in FIG. 18 which uses a plurality of PN code strings different in series may be used as the SS anti-duplication control signal generation section 36 of the output device 70 shown in FIG. 11.

In the third embodiment, PN code strings different in phase or series or codes formed by multiplying a plurality of different orthogonal codes by the PN code string are outputted as the SS anti-duplication control signal corresponding to the anti-duplication control signal as described herein before, however the present invention is by no means limited to these cases.

For example, the anti-duplication control signal may be spectrally spread using PN code strings different in phase or series as described herein above, or codes formed by combining one PN code string and a plurality of different orthogonal codes. In this case, the spread code used for spectral spreading is detected in the reception side, and inversion spectral spreading may be performed using the same spread code.

In the case that a plurality of spread code types is used as described herein above, it is possible to superimpose simultaneously a plurality of anti-duplication control signals. In other words, a plurality of anti-duplication control signals can be superimposed in the same time region.

[Fourth Embodiment]

Figure 19:
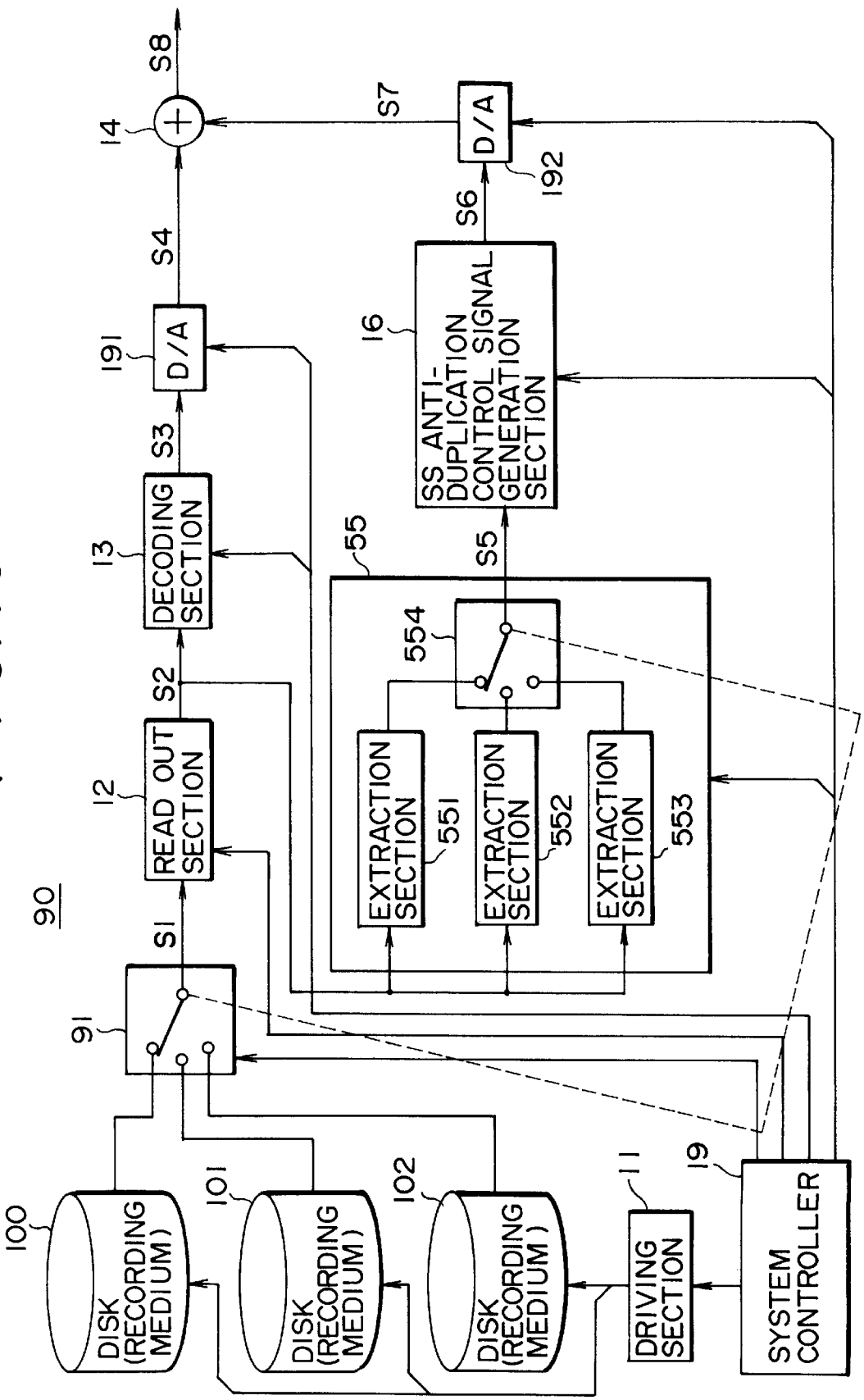
FIG. 19 is a block diagram for illustrating another example of the information output device as an information duplication prevention device in accordance with the present invention.

FIG. 19 is a block diagram for illustrating an output device 90 of the fourth embodiment. As shown in FIG. 19, the output device 90 of the fourth embodiment can have three different disks 100, 101, and 102, a disk specified by a user is selected out of three mounted disks and the selected disk is played back.

Such output device 90 is used for playing back different types of disk such as DVD, LD (laser disk), and CD-ROM or used for saving the trouble of exchanging the disk by mounting previously a plurality of disks.

In the description of the fourth embodiment, the case that three different type disks are mounted is described as an example. In the fourth embodiment, the disk 100 is a DVD, the disk 101 is a laser disk, and the disk 102 is a CD-ROM, and in this embodiment, video signal is recorded on all the disks and the output device 90 plays back and outputs the video signal. In the description of the output device 90 of the fourth embodiment, the case that the disk mounting section (place where a disk is mounted) is specified fixedly is described.

The output device 90 of the fourth embodiment extracts an anti-duplication control signal recorded on a disk, and then spectrally spreads and outputs it prior to outputting of the video signal recorded on a disk to be played back when a disk to be played back is selected by a user.

An anti-duplication control signal is added, for example, in the video signal recorded on a disk, and the anti-duplication control signal is different depending on the recording medium. The recorded position and format of an anti-duplication control signal are different depending on the type of a disk. The output device 90 of the fourth embodiment extracts an anti-duplication control signal from a disk selected by a user and spectrally spreads the anti-duplication control signal and outputs the resultant signal.

As shown in FIG. 19, a switch 91 is provided, and an anti-duplication control signal extraction section 55 for extracting the anti-duplication control signal recorded on the disk depending on the type of the disk is provided. Other components have the same structure as corresponding components of the output device 10 described using FIG. 1.

When a user selects a disk to be played back through a selector for selecting a disk mounted on the output device 90 not shown in the drawing, the system controller 19 supplies a control signal to an anti-duplication control signal extraction section 55.

Hence, a switch 91 and a switch 554 of the anti-duplication control signal extraction section 55 are switched correspondingly to the selection indication inputted by a user. The switch 91 and switch 554 of the anti-duplication control signal extraction section 55 are switched sequentially.

A signal obtained by playing back a disk selected by a user is supplied to the read out section 12 as the signal S1, the played back video signal component S2 is extracted, and the signal is supplied to a decoding section 12 and anti-duplication control signal extraction section 55. The played back video signal component S2 is a signal containing the anti-duplication control signal as in the case of output devices of the above-mentioned first, second, and third embodiments.

The system controller 19 controls the switch 91 and operates the read out section 12, anti-duplication control signal extraction section 55, SS anti-duplication control signal generation section 16, and D/A conversion circuit 192. When, the control signal from the controller 19 is not supplied to the decoding section 12 and D/A conversion section 191 so that the decoding section 12 and D/A conversion section 191 are not operated.

The anti-duplication control signal extraction section 55 is provided with extraction sections 551, 552, and 553 for extracting an anti-duplication control signal corresponding to a different type of a disk. In the fourth embodiment, the extraction section 551 is a component for extracting an anti-duplication control signal from a signal read out from the DVD. The extraction section 552 is a component for extracting an anti-duplication control signal from a signal read out from the laser disk. The extraction section 553 is a component for extracting an anti-duplication control signal from a signal read out from the CD-ROM. Using these extraction sections, the anti-duplication control signal extraction section 55 extracts an anti-duplication control signal S5 from the played back video signal component S2 obtained by playing back the selected disk, and supplies it to the SS anti-duplication control signal generation section 16.

The SS anti-duplication control signal generation section 16 generates a PN code string, spectrally spreads the anti-duplication control signal using this PN code string, and generates an SS anti-duplication control signal as in the case of the first embodiment. The generated SS anti-duplication control signal S6 is converted to an analog SS anti-duplication control signal S7 by the D/A conversion circuit 192, and outputs it through the addition circuit 14.

Hence, when a user selects a disk to be played back, the video signal recorded on the disk is read out. The anti-duplication control signal added in the video signal is extracted, the anti-duplication control signal is spectrally spread, and the resultant signal is outputted as an SS anti-duplication control signal. Therefore, prior to output of the video signal to be played back from the selected disk, for example, the anti-duplication control signal added in the video signal recorded on the disk is extracted and spectrally spread, and outputted.

As the result, in the recording device which receives a signal outputted from the output device 90 of the fourth embodiment, prior to supply of the video signal played back from the selected disk, the recording device receives supply of the anti-duplication control signal extracted from the disk on which the video signal is recorded and the condition for performing duplication prevention control of the subsequent video signal is arranged.

For playing back a disk selected by a user, the output device 90 operates the read out section 12, anti-duplication control signal extraction section 55, SS anti-duplication control signal generation section 16, D/A conversion circuit 192, and also D/A conversion circuit 191. The spectrally spread anti-duplication control signal is superimposed on the played back video signal by the addition section 14, and the resultant signal is outputted.

[Modified Example of the Fourth Embodiment]

Figure 20:
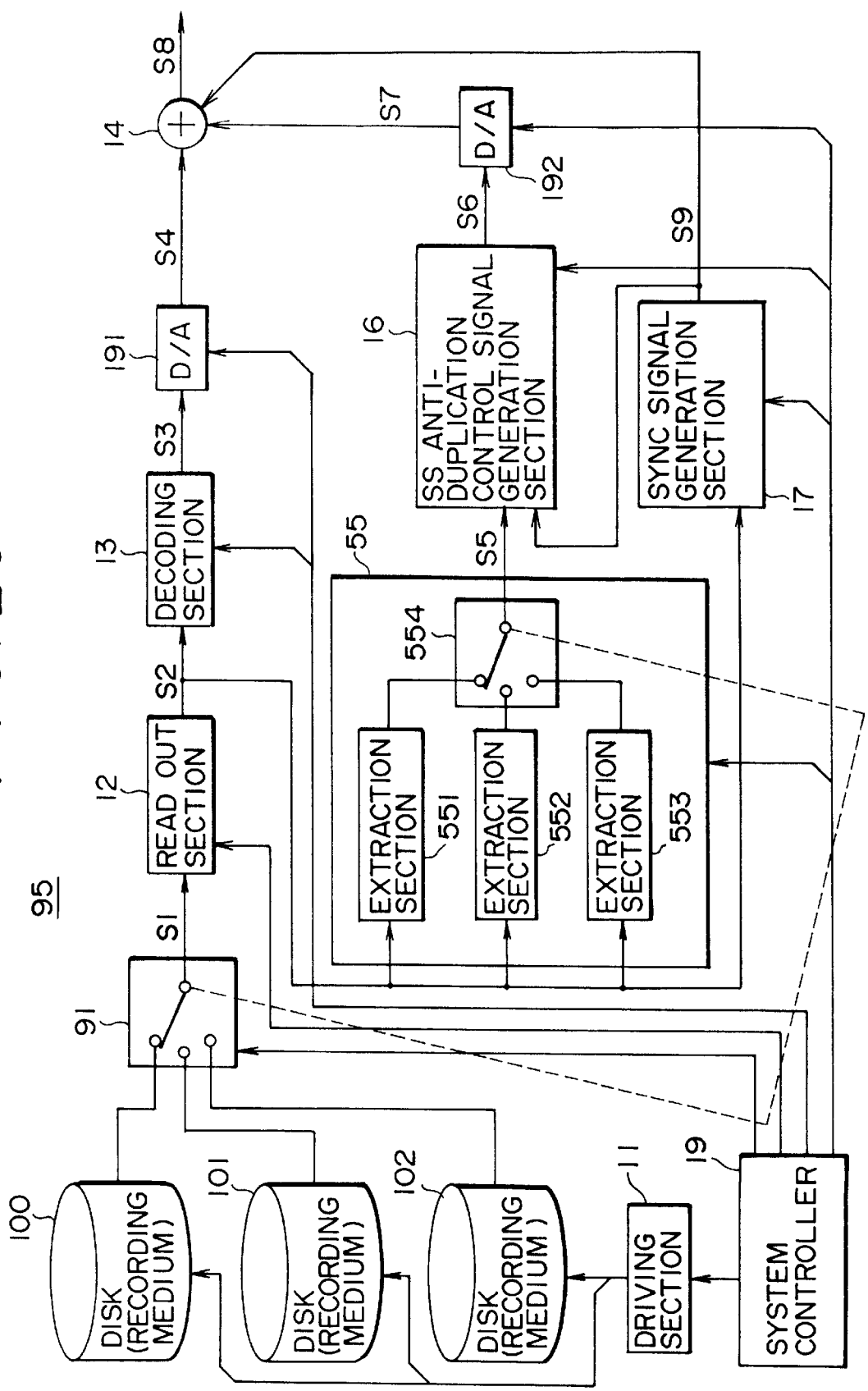
FIG. 20 is a block diagram for illustrating another example of the information output device as an information duplication prevention device in accordance with the present invention.

FIG. 20 is a block diagram for illustrating a modified example of the above-mentioned fourth embodiment. As shown in FIG. 20, an output device of this example is loaded with three different types of disk like the output device 90 shown in FIG. 19, and selects and plays back a disk corresponding to the selection indication from a user.

As shown in FIG. 20, the output device 95 of this example is provided with a driving section 11, read out section 12, decoding section 13, addition section 14, anti-duplication control signal extraction section 15, SS anti-duplication control signal generation section 16, system controller 19, switch 91, and D/A conversion circuits 191 and 192. The output device 95 of this example is provided additionally with a sync signal generation section 17.

The sync signal generation section 17 is the same as the sync signal generation section 17 of the above-mentioned second embodiment. In detail, the sync signal generation section 17 receives supply of a PN code string generated for spectrally spreading the anti-duplication control signal in the output device 95 of this example and a signal outputted from the output device 95, and generates a PN code sync timing signal S9 for synchronizing with the PN code detection string for detecting spectrally spread anti-duplication control signal contained in the signal.

Further, the sync signal generation section 17 in the output device 95 of this example receives supply of the played back video signal component S2 from the read out section 12, and then generates a PN code sync timing signal S9. As described herein before, the played back video signal component S2 contains the information for generating the vertical sync signal and horizontal sync signal to be added in the decoding section 13.

The sync signal generation section 17 of this example generates a PN code sync timing signal S9 which is synchronized with the vertical sync signal and has a period of one vertical interval using the information for generating the vertical sync signal contained in the played back video signal component S2, and supplies it to the SS anti-duplication control signal generation section 16 and addition section 14.

Hence, the SS anti-duplication control signal generation section 16 generates a PN code string having a predetermined code pattern every one vertical interval from the head. The anti-duplication control signal S5 is spectrally spread using this PN code string.

If the output device 95 is in the above-mentioned input waiting condition, the PN code sync timing signal S9 is outputted together with the analog SS anti-duplication control signal S10 because the PN code sync timing signal S9 is supplied also to the addition section 14.

Hence, in the recording device which receives a signal from the output device 95 of this example, the PN code sync timing signal contained in the signal from the output device 95 is detected, and a PN code detection string for detecting the spectrally spread anti-duplication control signal is generated based on the detected PN code sync timing signal. Thereby the PN code string for detection is generated at the same timing as the PN code string generated by the output device 95 synchronously with the PN code sync timing signal.

As the result, in the recording device which receives supply of a signal outputted from the output device 95, the PN code string for spreading which spectrally spreads the anti-duplication control signal is synchronized rapidly with the PN code string for detection to perform inversion spectral spreading, and the anti-duplication control signal is extracted.

In the above-mentioned output devices 90 and 95, a selector which selects a signal digitally may be used instead of the switch 91 and switch 554.

Further, in the above-mentioned output devices 90 and 95, the case that the SS anti-duplication control signal generation section generates the SS anti-duplication control signal S6 by spectrally spreading the anti-duplication control signal extracted by the anti-duplication control signal extraction section 55 using the PN code string, however the present invention is by no means limited to the case.

For example, The SS anti-duplication control signal generation section which generates a PN code string corresponding to the anti-duplication control signal out of a plurality of PN code strings having different phase deviation described using FIG. 13 may be used, or the SS anti-duplication control signal generation section which generates a plurality of PN code strings different in series described using FIG. 16 and which outputs the PN code strings different in phase or series corresponding to the control type of the anti-duplication control signal may be used. Alternatively, the SS anti-duplication control signal generation section which outputs a code formed by multiplying the PN code string of the predetermined series by the orthogonal code corresponding to the control type of the anti-duplication control signal selected out of a plurality of different orthogonal codes may be used.

In such case, an SS anti-duplication control signal detection section having the same structure as the SS anti-duplication control signal detection section described using FIG. 15 or FIG. 17 should be used as the SS anti-duplication control signal detection section of the recording device corresponding to the SS anti-duplication control signal generation section used in the output device.

Further, in the output device 95 described herein before using FIG. 20, the case that the PN code sync timing signal which is synchronized with the vertical sync signal and has a period of one vertical interval is generated is described, however the present invention is by no means limited to the case.

For example, the PN code sync timing signal which is synchronized with the vertical sync signal and has a period of a plurality of vertical intervals such as two vertical intervals or three vertical intervals may be generated, or alternately, one vertical interval is divided into a plurality of divided intervals such as ½ vertical interval or ¼ vertical interval, the PN code sync timing signal which has a period of one divided interval or a period of a plurality of divided intervals may be generated.

The horizontal sync signal may be synchronized instead of the vertical sync signal. In this case also, the PN code sync timing signal having a period of one horizontal interval, or a period of a plurality of horizontal intervals may be generated, or alternately one horizontal interval is divided into a plurality of divided intervals, then the PN code sync timing signal having a period of one divided interval or a period of a plurality of divided intervals may be generated.

In the fourth embodiment, the case that the PN code sync timing signal is generated as a signal which synchronizes with the video sync signal is described, however the present invention is by no means limited to the case. For example, the PN code sync timing signal may be generated as a signal which provides the timing predetermined by the sync signal generation section 17 of the output device 95.

In this case, if the output device 95 is brought from the input waiting condition into playback condition, the PN code sync timing signal is generated continuously and stably without interruption and without fluctuation of the period. When the output device 95 is brought into playback condition, the analog video signal S4 read out from the disk 100, SS anti-duplication control signal S11, and PN code sync timing signal S9 are superimposed and outputted as shown in FIG. 20.

Also in this case, the recording device which receives a signal from the output device 95 detects the PN code sync timing signal superimposed on the video signal, generates the PN code string having the same code pattern as the PN code string used for spectral spreading at the every timing indicated by the PN code sync timing signal, and the anti-duplication control signal spectrally spread and superimposed on the video signal is extracted quickly by performing inversion spectral spreading.

In the above-mentioned fourth embodiment, the case that a plurality of disks different in type is placed simultaneously, and a DVD, LD, and CD-ROM are mounted simultaneously is described, however the present invention is by no means limited to the case. For example, an output device may have the structure for being loaded simultaneously with various recording media such as a small sized magneto-optic disk called MD (mini-disk), music CD (music compact disk), CD on which the video information and audio information are recorded, and DAT (digital audio tape).

Further in the above-mentioned fourth embodiment, the case that a plurality of disks different in type is mounted simultaneously is described, however the present invention is by no means limited to the case. For example, an output device for being loaded with a plurality of disks of the same type may a be structured. In this case, the anti-duplication control signal extraction section 55 is not required to be corresponding to a plurality of disks different in type, for example, the same anti-duplication control signal extraction section may be used as the anti-duplication control signal extraction section 16 of the above-mentioned first embodiment.

The number of disks mounted simultaneously is not limited to three, the output device may be structured so that more disks are mounted.

Various codes such as Gold code may be used as a PN code to be used in the above-mentioned first, second, third, and fourth embodiments.

In the above-mentioned first, second, third, and fourth embodiments, the case that the information signal for transmission is the video signal is described, however the present invention is by no means limited to the case. For example, the present invention may be applied to the case that, for example, the audio signal or data is transmitted.

In the above-mentioned first, second, third, and forth embodiments, the case that the output device and recording device are a DVD device, or a device for recording/playing back a DVD, laser disk, or CD-ROM is described, however the present invention is by no means limited to the case, the present invention may be applied to the output device and recording device used for VTR, digital VTR, video disk, and video CD. That is, the present invention may be applied to either analog apparatus such as analog VTR and digital apparatus such as DVD device.

The present invention may be applied to the output device of the broadcasting station for outputting television signal, that is, the present invention may be applied to the case that the spectrally spread anti-duplication control signal is superimposed on the television signal to be transmitted.

For example, prior to broadcasting of a program, an anti-duplication control signal is transmitted. The reception side receives the anti-duplication control signal string transmitted prior to broadcasting of the program, then duplication prevention control of the video signal is performed based on the anti-duplication control signal.

Of course, the present invention may be applied to the output device and reception device for the case that the analog video signal is transmitted/received through a cable as in the case of cable television.

As described herein before, according to the information duplication prevention method and information duplication prevention device in accordance with the present invention, the output side outputs an anti-duplication control signal prior to output of the information signal such as video signal. Hence, the reception side can arrange the condition for performing duplication prevention control of the subsequent information signal corresponding to the anti-duplication control signal prior to reception of the information signal.

As the result, incomplete duplication prevention such as that only the head portion of the information signal is duplicated, or conversely, only the head portion of the information signal can not be duplicated is prevented.

By outputting the sync signal used for extracting the anti-duplication control signal in the reception side which receive supply of the information signal together with the anti-duplication control signal, the anti-duplication control signal is extracted quickly in the reception side.

What is claimed is:

1. An information control method for outputting an information signal and a control signal, the method comprising the steps of:

generating a control signal using a predetermined process;

outputting automatically said control signal without requiring a command to be input by a user and prior to a transmission of an information signal;

superimposing said control signal on said information signal at a time of outputting said information signal; and outputting a combined signal produced by superimposing said control signal on said information signal.

2. The information control method as claimed in claim 1, wherein said step of generating comprises the steps of:

generating a code for use in converting an additional information; and converting said additional information using said code and thereby generating said control signal.

3. The information control method as claimed in claim 2, wherein said step of generating a code includes generating a spread code, and said step of converting processes a spread coding process using said spread code and said additional information and thereby generating said control signal.

4. The information control method as claimed in claim 3, wherein said step of converting processes a spread spectrum process using said spread code and said additional information and thereby generating said control signal.

5. The information control method as claimed in claim 3, wherein said spread code is composed of a pseudo random noise code.

6. The information control method as claimed in claim 2, comprising the further step of combining with said control signal, outputted prior to transmission of said information signal, information for synchronizing said code used for converting said additional information.

7. The information control method as claimed in claim 6, wherein said information signal is a video signal and comprising the further step of synchronizing the information for synchronizing said code with a video synch signal in the video signal.

8. The information control method as claimed in claim 6, wherein said control signal includes information indicating a type of duplication control that corresponds to a phase of a plurality of said codes having different phases.

9. The information control method as claimed in claim 6, wherein said step of generating a control signal includes the step of generating a plurality of control signals having different phases.

10. The information control method as claimed in claim 6, wherein said control signal includes information indicating a type of duplication control that corresponds to a series of a plurality of said codes of different respective series.

11. The information control method as claimed in claim 6, wherein said step of generating a code includes generating a plurality of codes different in series.

12. The information control method as claimed in claim 2, wherein said control signal includes information indicating a type of duplication control that corresponds to a selected code out of a plurality of codes of different respective types generated by combining a code of one type and a plurality of orthogonal codes of different respective types.

13. The information control method as claimed in claim 2, wherein said control signal contains information indicating a type of duplication control that corresponds to a selected code out of a plurality of codes of different respective types generated by combining a plurality of codes having different respective phases and a plurality of orthogonal codes of different respective types.

14. The information control method as claimed in claim 2, wherein said step of generating a code includes generating a plurality of codes of different respective types generated by combining codes having different respective phases and a plurality of orthogonal codes of different respective types.

15. The information control method as claimed in claim 2, wherein said control signal contains information indicating a type of duplication control that corresponds to a code selected out of a plurality of codes of different respective types generated by combining a plurality of codes different in series and a plurality of orthogonal codes of different respective types.

16. The information control method as claimed in claim 2, wherein said step of generating a code includes generating a plurality of codes of different respective types generated by combining a plurality of codes having different respective phases and a plurality of orthogonal codes of different respective types.

17. The information control method as claimed in claim 1, wherein said combined signal is recorded on a plurality of recording media and further comprising the step of reading out said control signal from a selected one of said plurality of recording media.

18. The information control method as claimed in claim 17, comprising the further steps of:
encoding the control signal read out from the selected one of the plurality of recording media; and
superimposing the encoded control signal on said information signal for outputting as an analog signal, wherein said control signal is read out from the selected one of the plurality of recording media prior to outputting the information signal played back from the selected one of the plurality of recording media.

19. The information control method as claimed in claim 1, wherein said control signal comprises a digital data bit string recorded on a recording medium.

20. The information control method as claimed in claim 1, wherein said control signal indicates control information for controlling a duplication of said information signal on a receiving side of said control signal.

21. An information output device for outputting an information signal and a control signal comprising:
means for generating a control signal using a predetermined process;
means for automatically outputting said control signal without requiring a command to be input by a user and prior to a transmission of an information signal;
means for superimposing said control signal on said information signal at a time of outputting said information signal; and
means for outputting a combined signal produced by superimposing said control signal on said information signal.

22. The information output device as claimed in claim 21, wherein said means for generating comprises:
means for generating a code for use in converting additional information; and
means for converting said additional information using said code and thereby generating said control signal.

23. The information output device as claimed in claim 22, wherein
said means of generating a code includes means for generating a spread code, and
said means for converting processes a spread coding process using said spread code and said additional information and thereby generating said control signal.

24. The information output device as claimed in claim 23, wherein said means for converting processes a spread spectrum process using said spread code and said additional information and thereby generating said control signal.

25. The information output device as claimed in claim 23, wherein said spread code is composed of a pseudo random noise code.

26. The information output device as claimed in claim 22, further comprising means for combining with said control signal, outputted prior to transmission of said information signal, information for synchronizing said code used for converting said additional information.

27. The information output device as claimed in claim 26, wherein said information signal is a video signal and comprising means for synchronizing the information for synchronizing said code with a video synch signal in the video signal.

28. The information output device as claimed in claim 22, wherein said control signal includes information indicating a type of duplication control that corresponds to a phase of a plurality of said codes having different phases.

29. The information output device as claimed in claim 22, wherein said means for generating a control signal includes means for generating a plurality of control signals having different phases.

30. The information output device as claimed in claim 22, wherein said control signal includes information indicating a type of duplication control that corresponds to a series of a plurality of said codes of different respective series.

31. The information output device as claimed in claim 22, wherein said means for generating a code includes means for generating a plurality of codes different in series.

32. The information output device as claimed in claim 22, wherein said control signal includes information indicating a type of duplication control that corresponds to a selected code out of a plurality of codes of different respective types generated by combining a code of one type and a plurality of orthogonal codes of different respective types.

33. The information output device as claimed in claim 27, wherein said control signal contains information indicating a type of duplication control that corresponds to a selected code out of a plurality of codes of different respective types generated by combining a plurality of codes having different respective phases and a plurality of orthogonal codes of different respective types.

34. The information output device as claimed in claim 22, wherein said means for generating a code includes means for generating a plurality of codes of different respective types generated by combining codes having different respective phases and a plurality of orthogonal codes of different respective types.

35. The information output device as claimed in claim 22, wherein said control signal contains information indicating a type of duplication control that corresponds to a code selected out of a plurality of codes of different respective types generated by combining a plurality of codes different in series and a plurality of orthogonal codes of different respective types.

36. The information output device as claimed in claim 22, wherein said means for generating a code includes means for generating a plurality of codes of different respective types generated by combining a plurality of codes having different respective phases and a plurality of orthogonal codes of different respective types.

37. The information output device as claimed in claim 21, wherein said combined signal is recorded on a plurality of recording media and further comprising means for reading out said control signal from a selected one of said plurality of recording media.

38. The information output device as claimed in claim 37, further comprising:

means for coding the control signal read out from the selected one of the plurality of recording media; and means for superimposing the encoded control signal on said information signal, for outputting as an analog signal, wherein said control signal is read out from the selected one of the plurality of recording media prior to outputting the information signal played back from the selected one of the plurality of recording media.

39. The information output device as claimed in claim 21, wherein said control signal comprises a digital data bit string recorded on a recording medium.

40. The information output device as claimed in claim 21, wherein said control signal indicates control information for controlling a duplication of said information signal on a receiving side of said control signal.

\* \* \* \* \*